United States Patent
Sim

(10) Patent No.: US 8,957,844 B2
(45) Date of Patent: Feb. 17, 2015

(54) DISPLAY DEVICE AND BACKLIGHT UNIT

(75) Inventor: Jaedoo Sim, Seoul (KR)

(73) Assignee: LG Electronics Inc., Seoul (KR)

(*) Notice: Subject to any disclaimer, the term of this patent is extended or adjusted under 35 U.S.C. 154(b) by 737 days.

(21) Appl. No.: 13/019,859

(22) Filed: Feb. 2, 2011

(65) Prior Publication Data

US 2011/0216250 A1 Sep. 8, 2011

Related U.S. Application Data

(60) Provisional application No. 61/310,796, filed on Mar. 5, 2010.

(30) Foreign Application Priority Data

Mar. 12, 2010 (KR) ........................ 10-2010-0022203

(51) Int. Cl.
*G09G 3/36* (2006.01)
*F21V 7/22* (2006.01)
*H04N 5/70* (2006.01)

(52) U.S. Cl.
CPC ... *F21V 7/22* (2013.01); *H04N 5/70* (2013.01)
USPC ............... 345/102; 345/82; 345/690; 345/92; 362/612; 362/97.3

(58) Field of Classification Search
CPC ... G09G 3/3406; G09G 3/3413; G09G 3/342; G09G 3/3426
USPC ........ 345/102, 82, 87, 690, 92; 362/600, 612, 362/246–247, 97.1–97.3
See application file for complete search history.

(56) References Cited

U.S. PATENT DOCUMENTS

| | | | |
|---|---|---|---|
| 2002/0008694 A1* | 1/2002 | Miyachi et al. | 345/204 |
| 2004/0114396 A1* | 6/2004 | Kobayashi et al. | 362/561 |
| 2004/0130884 A1* | 7/2004 | Yoo et al. | 362/31 |
| 2006/0087588 A1* | 4/2006 | Cok | 348/556 |
| 2008/0245952 A1* | 10/2008 | Troxell et al. | 250/208.1 |
| 2008/0252591 A1* | 10/2008 | Peeters et al. | 345/102 |
| 2009/0303170 A1* | 12/2009 | Chung et al. | 345/102 |
| 2010/0246164 A1* | 9/2010 | Tung et al. | 362/97.3 |
| 2011/0001693 A1* | 1/2011 | Kim et al. | 345/102 |
| 2011/0267385 A1* | 11/2011 | Ninan | 345/690 |

FOREIGN PATENT DOCUMENTS

WO   WO 2009/084894   *   3/2009

* cited by examiner

*Primary Examiner* — Lun-Yi Lao
*Assistant Examiner* — Md Saiful A Siddiqui
(74) *Attorney, Agent, or Firm* — KED & Associates LLP

(57) ABSTRACT

A display device comprises: a first substrate; LED light sources mounted on the first substrate; a backlight unit comprising a side surface on which light emitted from the LED light sources is incident and a back surface from which light is emitted in a direction different from the direction of the light incident on the side surface; and a panel disposed on the backlight unit and displaying a video image, wherein at least the first and second LED light sources adjacent to each other, among the LED light sources on the first substrate, are controlled differently from the other LED light sources on the first substrate based on the video image.

18 Claims, 32 Drawing Sheets

Fig. 11
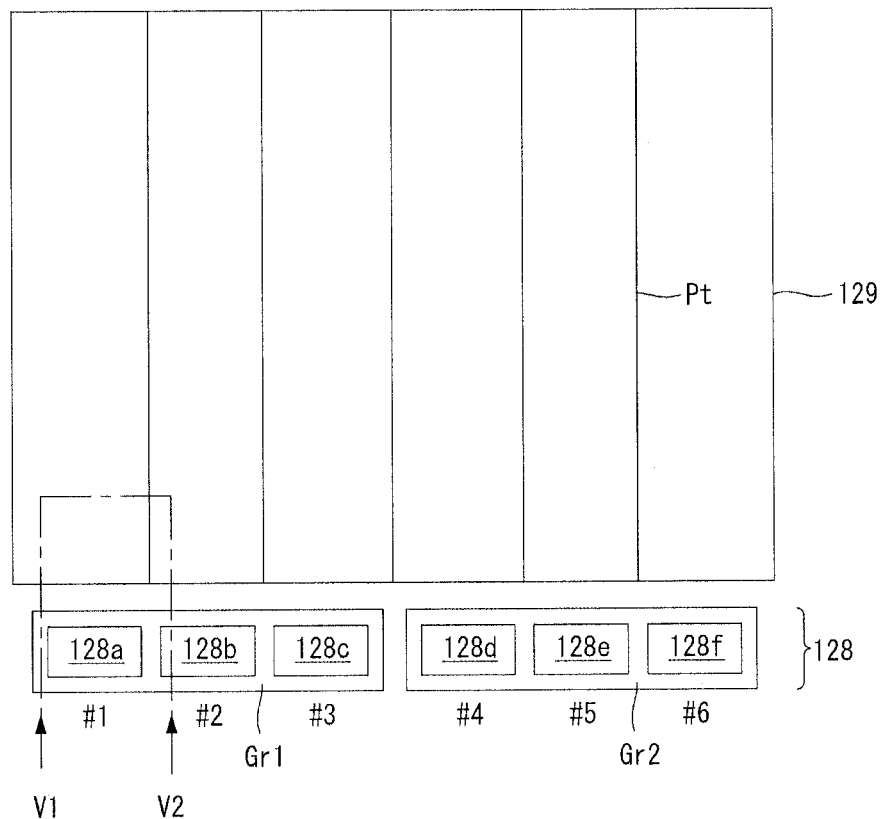
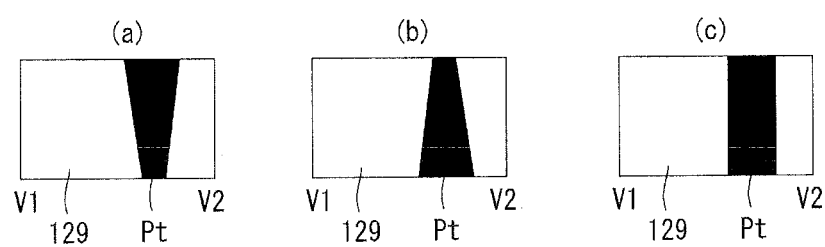

Fig. 18
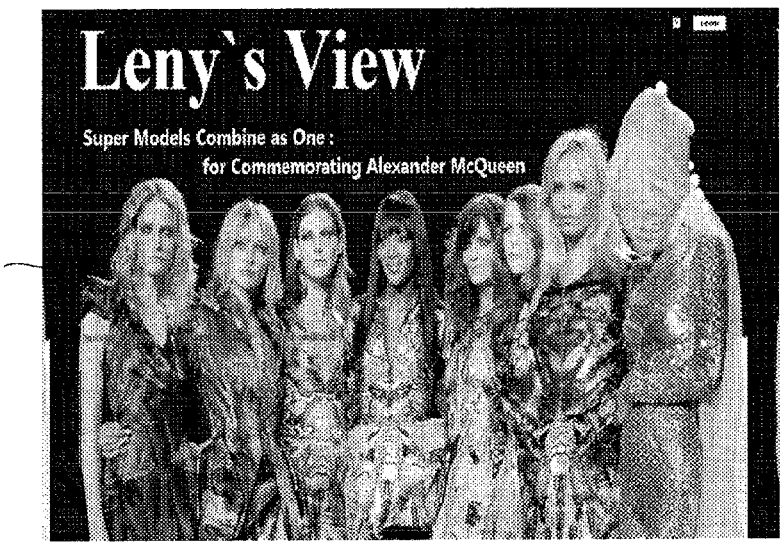
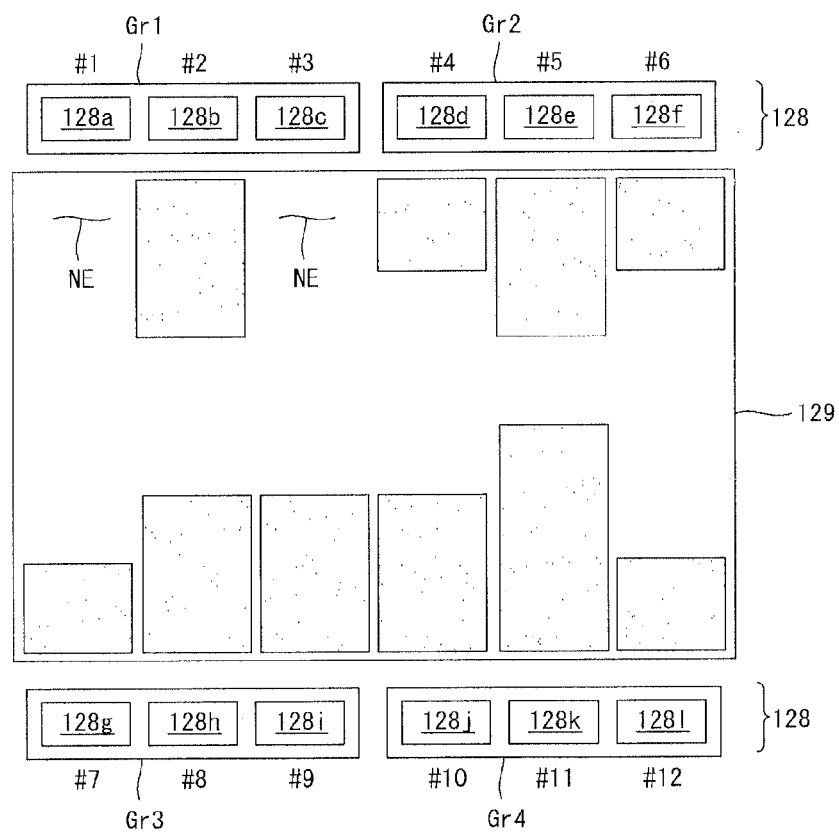

Fig. 27
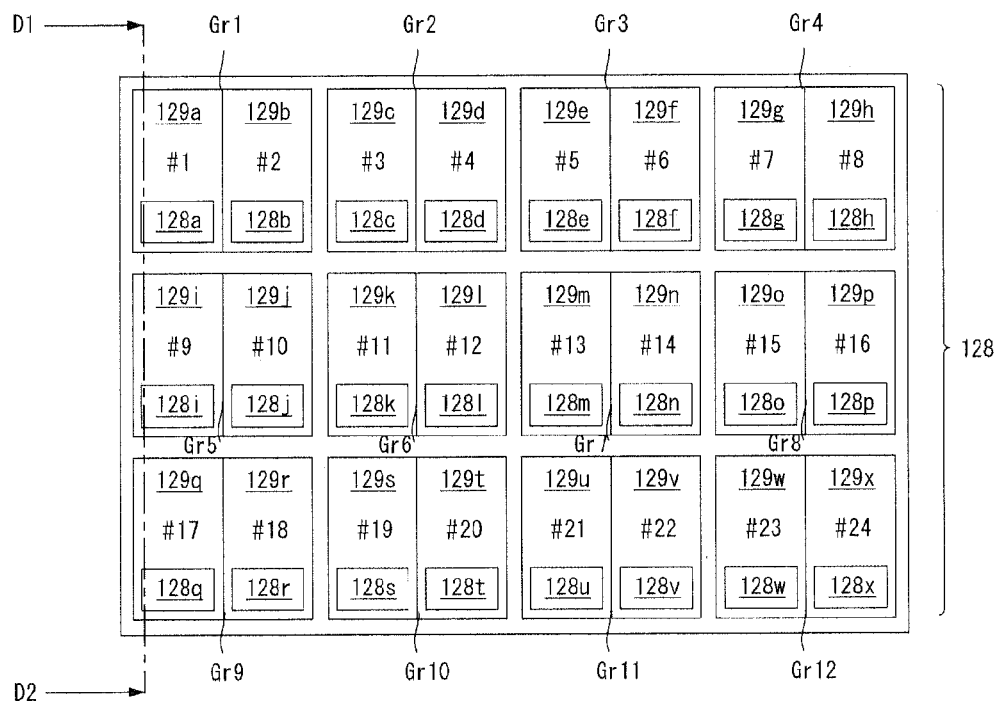
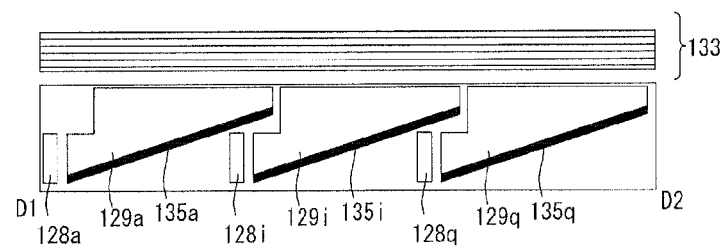

DISPLAY DEVICE AND BACKLIGHT UNIT

This application claims the benefit of Korean Patent Application No. 10-2010-0022203 filed on Mar. 12, 2010, and U.S. Provisional Application No. 61/310,796 filed Mar. 5, 2010, which are hereby incorporated by reference.

BACKGROUND

1. Field

This document relates to a display device and a backlight unit.

2. Related Art

With the development of the information technology, the market of display devices, that is, connection media between users and information is expanded. In line with this trend, the use of various flat panel display devices is increasing.

Of the flat panel display devices, a light receiving display device uses light provided from a backlight unit. The backlight unit is classified as an edge type backlight unit, a dual type backlight unit, a direct type backlight unit, etc to provide light to a display panel.

As such, there is a necessity that a display device using a backlight unit has to be provided with means for enhancing contrast ratio and motion blur and reducing power consumption according to an image to be displayed on a display panel and the structure of the backlight unit.

SUMMARY

An aspect of this document is to provide a display device comprising: a first substrate; LED light sources mounted on the first substrate; a backlight unit comprising a side surface on which light emitted from the LED light sources is incident and a back surface from which light is emitted in a direction different from the direction of the light incident on the side surface; and a panel disposed on the backlight unit and displaying a video image, wherein at least the first and second LED light sources adjacent to each other, among the LED light sources on the first substrate, are controlled differently from the other LED light sources on the first substrate based on the video image.

Another aspect of this document is to provide a display device comprising; a first substrate; LED light sources mounted on the first substrate; and a backlight unit comprising a side surface on which light emitted from the LED light sources is incident and a back surface from which light is emitted in a direction different from the direction of the light incident on the side surface, wherein at least the first and second LED light sources adjacent to each other, among the LED light sources on the first substrate, are controlled differently from the other LED light sources on the first substrate based on the video image.

BRIEF DESCRIPTION OF THE DRAWINGS

The accompanying drawings, which are included to provide a further understanding of the invention and are incorporated on and constitute a part of this specification, illustrate embodiments of the invention and together with the description serve to explain the principles of the invention.

FIG. 11 is another illustration of a light guide plate;

FIGS. 18 to 20 are another illustrations of the local dimming mode of the dual type backlight unit;

FIG. 27 is a view for explaining a direct type backlight unit;

DETAILED DESCRIPTION

Reference will now be made in detail embodiments of the invention, examples of which are illustrated in the accompanying drawings.

Hereinafter, concrete exemplary embodiments according to the present invention will be described with reference to the accompanying drawings.

Figure 1:
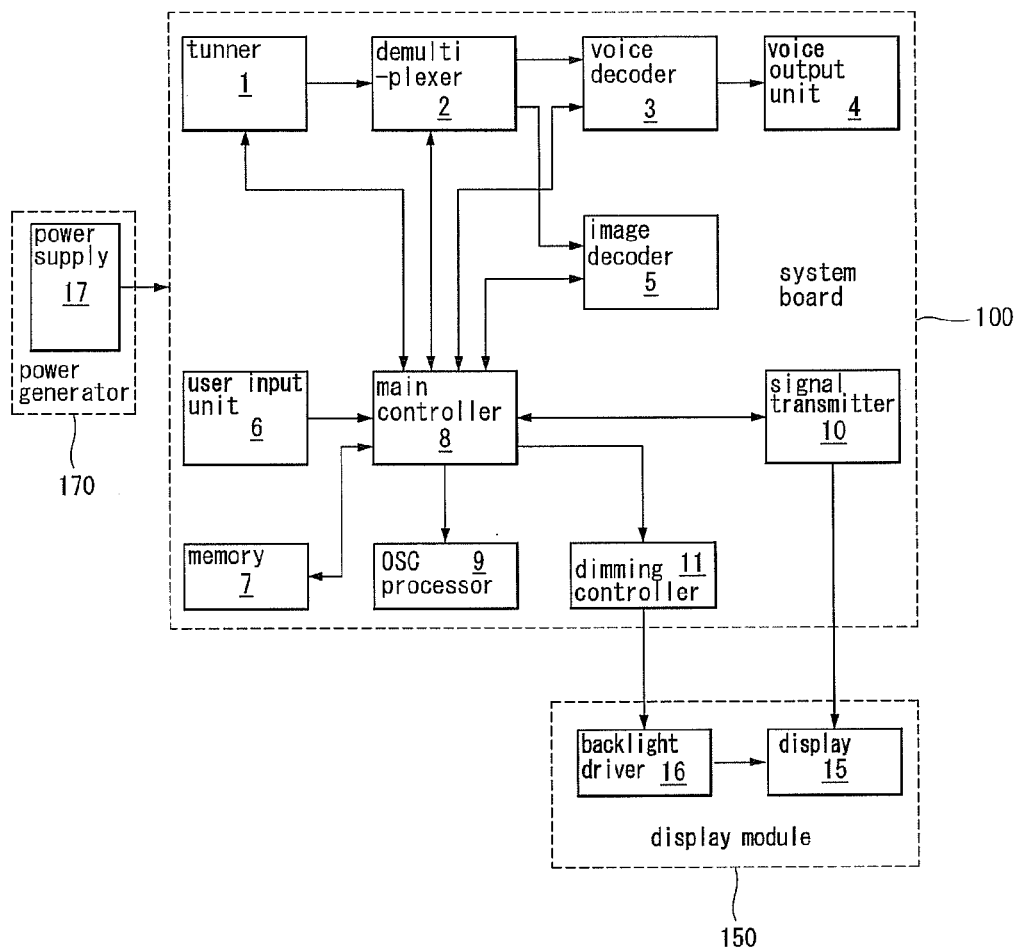
FIG. 1 is a schematic block diagram of a display device according to one exemplary embodiment of the present invention.
Figure 2:
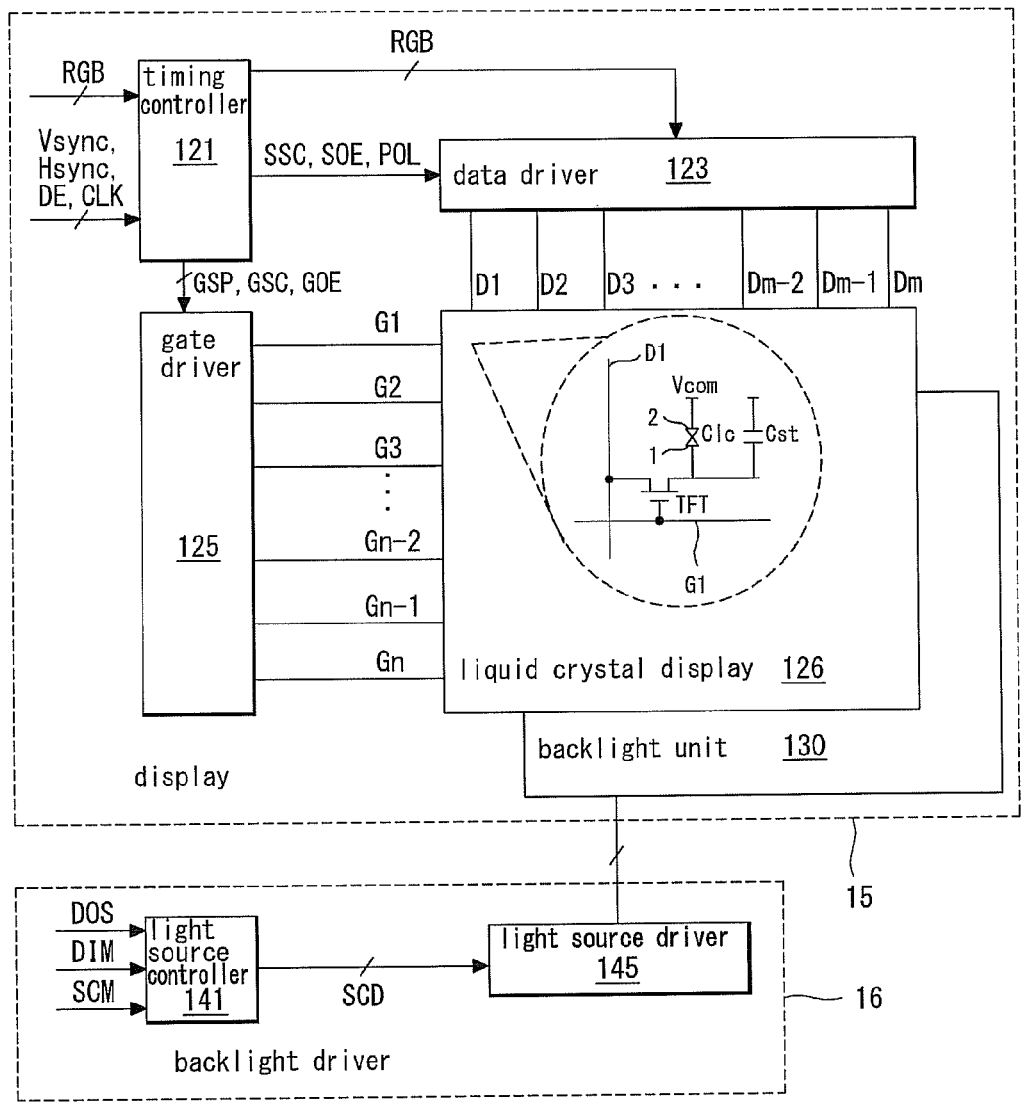
FIG. 2 is a schematic block diagram for explaining a display module and a backlight driver.

FIG. 1 is a schematic block diagram of a display device according to one exemplary embodiment of the present invention. FIG. 2 is a schematic block diagram for explaining a display module and a backlight driver;

As shown in FIG. 1, a display device according to one exemplary embodiment of the present invention comprises a system board 100, a power generator 170, and a display module 150. The devices included in the system board 100, the power generator 170, and the display module 150 will be briefly described as follows.

The system board 100 comprises a tuner 1, a demultiplexer 2, a voice decoder 3, a voice output unit 4, an image decoder 5, a user input unit 6, a memory 7, a main controller 8, an OSC processor 9, a signal transmitter 10, and a dimming controller 11. The tuner 1 selects and outputs a broadcast signal having a frequency band selected by the main controller 8 from among broadcast signals received from an antenna, a cable, a satellite, or the like. The demultiplexer 2 demultiplexes the broadcast signal provided from the tuner 1 and divides it into an image signal and a voice signal. The voice decoder 3 decodes the compression-coded voice signal supplied from the demultiplexer 2 and restores it to the original voice signal. The voice output unit 4 outputs the voice signal supplied from the voice decoder 3 by a speaker or the like. The image decoder 4 decodes the compression-coded image signal supplied from the demultiplexer 2 and restores it to the original image signal and scales it. The user input unit 6 receives an input of broadcast channel registration or broadcast channel change by a user's manipulation, and generates an input signal corresponding to the user's manipulation. The user input unit 6 may be a remote controller, an input button or touch screen formed outside the display device, etc. If the user input unit 6 is a remote controller, the user input unit 6 may generate a menu selection signal corresponding to a signal wirelessly received from the remote controller and supply it to the main controller 8. The main controller 8 performs the reception of a broadcast signal or image processing, as well as controlling the operations of the devices connected to the main controller 8, using data or information stored in the memory 7 formed inside or outside thereof in response to an input signal input through the user input unit 6. The main controller 8 can process data to store and edit a broadcast channel, an image, etc. displayed on the display module 150 by using the memory 7 formed inside or outside thereof. The OSD processor 9 outputs an OSD signal to output a user-selectable menu or a sample image, symbols, characters, numbers, etc. in an OSD image. The signal processor 10 transmits an image signal or the like to a display 15 via an interface. The dimming controller 11 generates a dimming control signal in conjunction with the main controller 8, and controls the backlight driver 16 using the dimming control signal. Although at least one of the tuner 1, the demultiplexer 2, the voice decoder 3, the voice output unit 4, the image decoder 5, the user input unit 6, the memory 7, the main controller 8, the OSD processor 9, the signal transmitter 10, and the dimming controller 11 may be integrated in one chip, they are illustrated separately for the sake of convenience.

The display module 150 is driven based on an image signal, a dimming control signal, etc that are supplied via the interface. The display module 150 comprises the display 15 for displaying an image based on an image signal and the backlight driver 16 for controlling the backlight unit providing light to the display 15 based on a dimming control signal. The display 15 comprises a liquid crystal display panel for displaying an image and the backlight unit for providing light to the liquid crystal display panel.

The power generator 170 comprises a power supply for converting an externally supplied power and supplying it to the system board 100 and the display module 150. The power supply 17 converts an externally supplied AC power into a plurality of DC powers. The devices included in the system board 100 and the display module 150, respectively, are driven based on a power supplied from the power generator 170.

As shown in FIG. 2, the display module 150 comprises the display 15 and the backlight driver 16. The display 15 comprises a timing controller 121, a data driver 123, a gate driver 125, a liquid crystal display panel 126, and a backlight unit 130.

The timing controller 121 receives system signals, such as an image signal RGB, a vertical synchronization signal Vsync, a horizontal synchronization signal Hsync, a data enable signal DE, and a dot clock CLK, from the system board 100 via a low voltage differential signaling (LVDS) interface or a transition minimized differential signaling (TMDS) interface. The timing controller 121 supplies an image signal RGB to the data driver 123, and generates data timing signals, such as a source sampling clock SSC, a source output enable SOE, and a polarity control signal POL, to control the data driver 123 using the timing signals Vsync, Hsync, DE, and CLK. The timing controller 121 generates gate timing signals including a gate start pulse GSP, a gate shift clock GSC, and a gate output enable signal GOE to control the gate driver 125. The data driver 123 samples and latches the image signal RGB to convert it into data having a parallel data configuration on the basis of the data timing signals SSC, SOE, and POL supplied from the timing controller 121. The data driver 123 converts the image signal RGB converted into a parallel data transmission configuration into positive and negative data voltages to be charged in liquid crystal cells by using positive and negative gamma reference voltages, and supplies them to data lines D1 to Dm. The gate driver 125 sequentially shifts a gate driving voltage in response to the gate timing signals GSP, GSC, and GOE supplied from the timing controller 121, and sequentially supplies it to gate lines G1 to Gn.

The liquid crystal display panel 126 comprises a transistor substrate and a color filter substrate joined together with a liquid crystal layer therebetween. The liquid crystal display panel 126 comprises a pixel array arranged in a matrix to display an image. The pixel array is formed at intersections of the data lines D1 to Dm and the gate lines G1 to Gn, and comprises a thin film transistor TFT, a storage capacitor Cst, a pixel electrode 1, a common electrode 2, and a liquid crystal cell Clc. An alignment film for setting a pre-tilt angle of liquid crystal is formed inside the transistor substrate and color filter substrate constituting the liquid crystal display panel 126, and a polarizing plate is attached to the outside thereof. A liquid crystal mode of the liquid crystal display panel 126 may be a Twisted Nematic (TN) mode, a Vertical Alignment (VA) mode, an In-Plane Switching (IPS) mode, a Fringe Field Switching (FFS) mode, an Electrically Controlled Birefringence (ECB) mode, or any other mode.

The backlight unit 130 comprises light sources arranged to provide light to the liquid crystal display panel 126 and divided into a plurality of light source groups. The light sources included in the backlight unit 130 are controlled by the backlight driver 16.

The backlight driver 16 comprises a light source controller 141 and light source drivers 145. The light source controller 141 controls the light source drivers 145 based on dimming signals DOS and DIM supplied from the main controller 8 and a dimming control signal SCM supplied from the dimming controller 11 so that the backlight unit 130 operates in a global dimming mode or local dimming mode. The light source drivers 145 drive the light sources included in the backlight unit 130 based on a light source drive signal SCD supplied from the light source controller 141.

Hereinafter, the devices for driving the backlight unit will be described in more detail.

Figure 3:
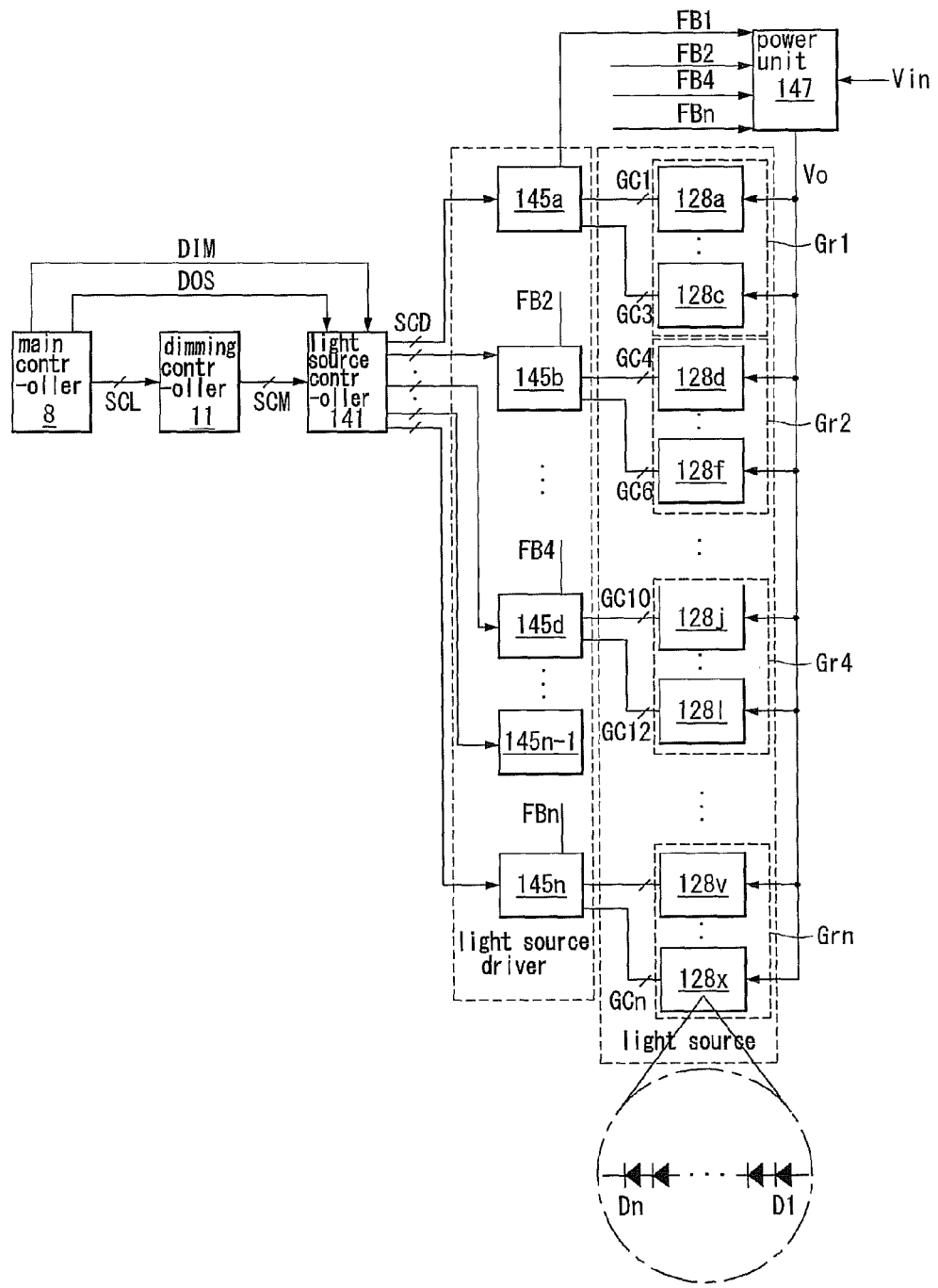
FIG. 3 is a block diagram for explaining devices for driving a backlight unit according to one exemplary embodiment of the present invention.
Figure 4:
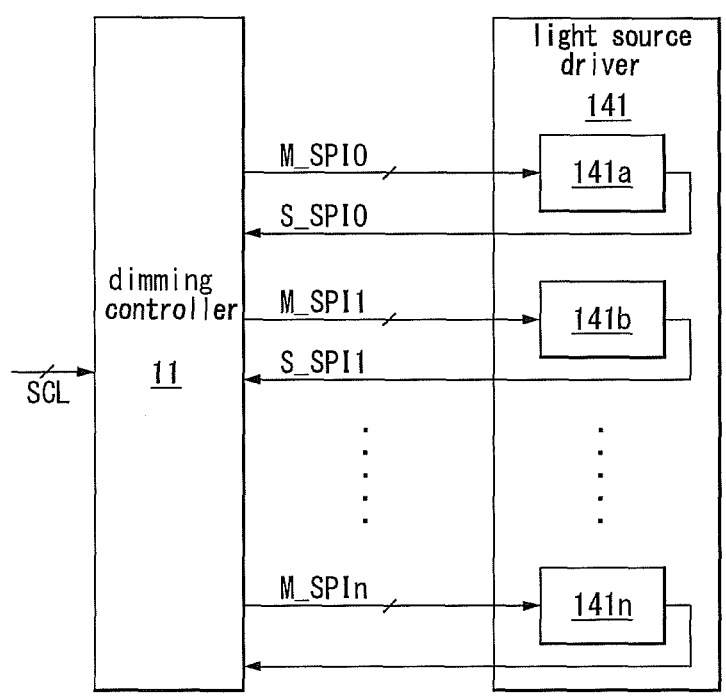
FIG. 4 is an illustration of the configuration of a dimming controller and a light source controller.
Figure 5:
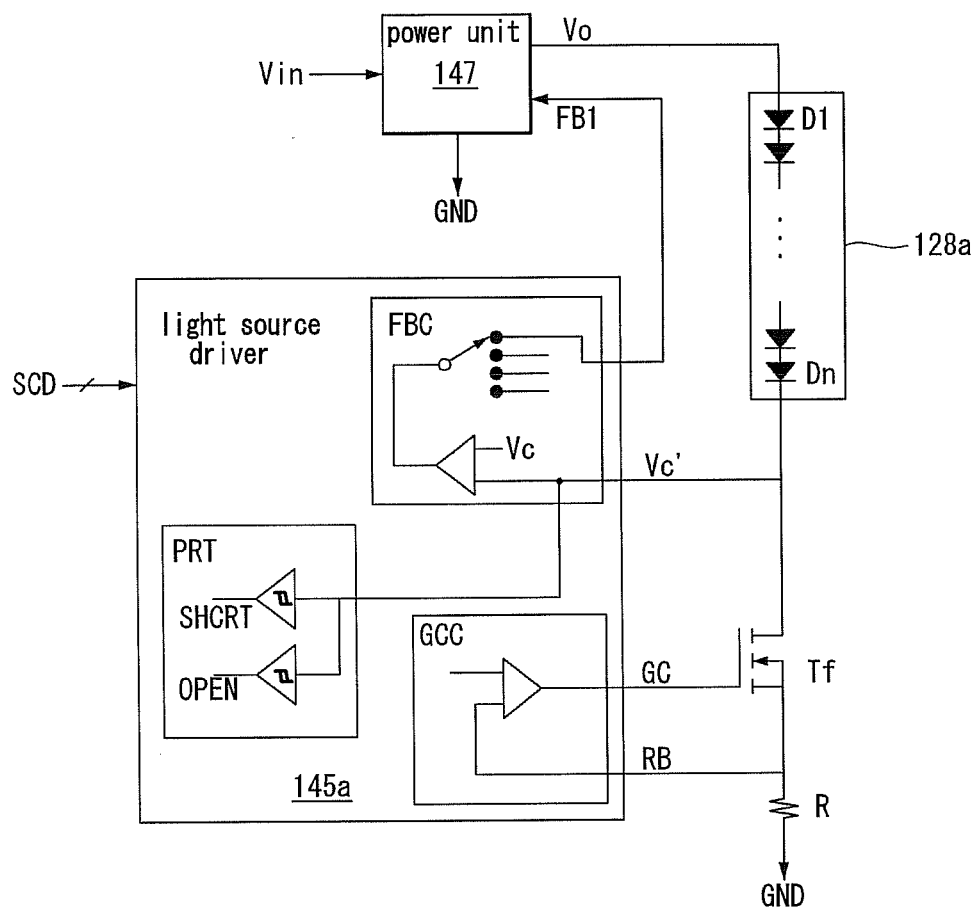
FIG. 5 is an illustration of the configuration of a light source driver and light sources.

FIG. 3 is a block diagram for explaining devices for driving the backlight unit according to one exemplary embodiment of the present invention. FIG. 4 is an illustration of the configuration of a dimming controller and a light source controller. FIG. 5 is an illustration of the configuration of a light source driver and light sources.

As shown in FIGS. 3 to 5, the main controller 8 generates diming signals DOS and DIM based on an image signal, and supplies them to the light source controller 141. Moreover, the main controller 8 generates a dimming drive signal SCL including a vertical synchronization signal Vsync, etc., and supplies it to the dimming controller 11. The first dimming signal DOS, which is an activation signal DOS for controlling the driving of the light source controller 141, serves to select and activate a device to be driven from among first to N-th light source controllers 141a to 141n. On the other hand, the second dimming signal DIM, which is a dimming signal DIM for controlling a light source drive signal SCD output from the light source controller 141, serves to determine the dimming duty of an activated device among the first to N-th light source controllers 141a to 141n. Here, the second dimming signal DIM is generated as a signal with pulse width modulation (PWM). The dimming duty of the first to N-th light source drivers 145a to 145n driven by the first to N-th light source controllers 141a to 141n varies depending on the duty of a PWM signal. Therefore, the operation for activating or deactivating the driving of the first to N-th light source controllers 141a to 141n is determined according to the waveform of the first dimming signal DOS, and the dimming duty of the first to N-th light source drivers 145a to 145n is determined according to the duty of the second dimming signal DIM.

The dimming controller 11 generates a dimming control signal SCM including a vertical synchronization signal Vsync, dimming data S-in, and a data clock S-CLK to control the backlight unit 130 in the local dimming mode based on the dimming drive signal SCL supplied form the main controller 8, and supplies it to the light source controller 141.

The light source controller 141 controls the light source drivers 145 in response to the dimming signals DOS and DIM supplied from the main controller 8 and the diming control signal SCM supplied from the dimming controller 11. The light source controller 141 may be divided into the first to N-th light source drivers 145a to 145n, and they may be configured to transmit and receive data or the like via short-distance communication, e.g., SPI (Serial Peripheral Interface) (M_SPIO, S_SPIO~M_SPIn, and S_SPIn), so as to be individually controlled by the dimming controller 11. The reason of the use of short-distance communication M_SPIO, S_SPIO~M_SPIn, and S_SPIn is for the dimming controller 11 to control the first to N-th light source drivers 145a to 145n, respectively. The first to N-th light source drivers 145a to 145n are respectively designated by difference addresses, so only a device selected by the dimming control signal SCM supplied from the dimming controller 11 is driven. The thus-configured light source controller 141 controls the light source drivers 145 so that the backlight unit 130 operates in the global dimming mode or the local dimming mode. For example, the light source controller 141 can request only the dimming signals DOS and DIM in order to control the light source drivers 145 in the global dimming mode. In this case, the light source controller 141 drives the light source drivers 145 to make all the light sources included in the backlight unit 130 emit light with reference to the vertical synchronization signal Vsync included in the dimming signals DOS and DIM. At this point, the brightness of the light sources included in the backlight unit 140 may vary depending on the duty of the second dimming signal DIM included in the dimming signals DOS and DIM. In contrast, the light source controller 141 may request the dimming signals DOS and DIM and the dimming control signal SCM in order to control the light source drivers 145 in the local dimming mode. In this case, the light source controller 141 drives the light source drivers 145 to make part of the light sources included in the backlight unit 130 individually emit light with reference to the vertical synchronization signal Vsync included in the dimming signals DOS and DIM. At this point, the brightness of the light sources included in the backlight unit 130 may vary depending on the duty of the second dimming signal DIM included in the dimming signals DOS and DIM and a value of the operation result of the dimming data S-in included in the dimming control signal SCM.

The light source drivers 145 generates gate signals GC1 to GCn in response to the light source drive signal SCD supplied from the lights source controller 141, and make the light sources 128a to 128x included in the backlight unit 130 emit light in the global dimming mode or the local dimming mode. One light source driver 145a may be configured to drive an N (N is 1 or greater) number of, e.g., three light sources 128a to 128c. However, the light source driver is not limited thereto but may be configured to drive at least one light source.

The light sources 128a to 128x emit light in response to an output voltage Vo supplied from a power unit 147 and the gate signals GC1 to GCn supplied from the light source drivers 145. The power unit 147 may receive, as an input voltage Vin, one of powers output from the power supply unit 17, and may be included in the power generator 170. Of the light sources 128a to 128x, an N (N is 1 or greater) number of, e.g., three light sources 128a to 128c may be configured as one light source group Gr1. However, the light sources are not limited thereto but at least one light source may be configured as one light source group. One light source 128a comprises first to N-th light emitting parts D1 to Dn. The first to N-th light emitting parts D1 to Dn may comprise at least two light emitting diodes, but are not limited thereto. In one example, the number of packages of light emitting diodes constituting the first to N-th light emitting parts D1 to Dn ranges from to 12 or greater according to the size of the liquid crystal display panel. The light sources 128a to 128x included in the first to N-th light source groups Gr1 to Grn are driven in the global dimming mode to emit light altogether or in the local dimming mode to emit light individually in response to the gate signals GC1 to GCn supplied from the light source drivers 145. In the following description, one light source group may be defined per printed circuit board, and the light sources included in one light source group may be defined as the smallest units of light emitting parts capable of individual control, i.e., one light emitting diode package.

Each of the light source drivers 145 performs a driving operation, such as supplying feedback signals FB1 to FBn to the power unit 147 and adjusting the output voltage Vo of the power unit 147 with respect to the input voltage Vin, as follows. One light source driver 145a supplies a gate signal GC1 generated in response to a light source drive signal SCD to a gate electrode of a transistor Tf to control current flowing through the light source 128a. The transistor Tf may be formed as a field effect transistor FET, but is not limited thereto. In the control process of the light source 128a, one light source driver 145a generates a feedback signal FB1 by comparison between a voltage Vc set therein and a voltage Vc' flowing through the light source 128a, and supplies it to the power unit 147. Accordingly, the power unit 147 can output a stable output voltage Vo, for example, by varying the output voltage Vo with respect to the input voltage Vin based on the feedback signal FB1. Moreover, in the control process of the light source 128a, one light source driver 145a can detect the opening or shorting of the first to N-th light emitting parts D1 to Dn included in the light source 128a by using the voltage Vc' flowing through the light source 128a. Therefore, the transistor Tf can be driven stably through the monitoring by means of one light source driver 145a. Further, in the control process of the light source 128a, one light source driver 145a can control the transistor TF by a current feedback (RB) from a resistor Rs formed between the transistor Tf and a ground GND. Accordingly, the light source 128a and the transistor Tf can prevent overcurrent flow through the monitoring by means of one light source driver 145a. That is, one light source driver 145a comprises a gate controller GCC for controlling the transistor Tf or the like, a feedback signal generator FBC for generating a feedback signal FB1 or the like, and a protector PRT for protecting the light source 128a or the like.

Hereinafter, the arrangement of the light sources included in the backlight unit and driving examples thereof will be described in more detail.

[Edge Type Backlight Unit]

Figure 6:
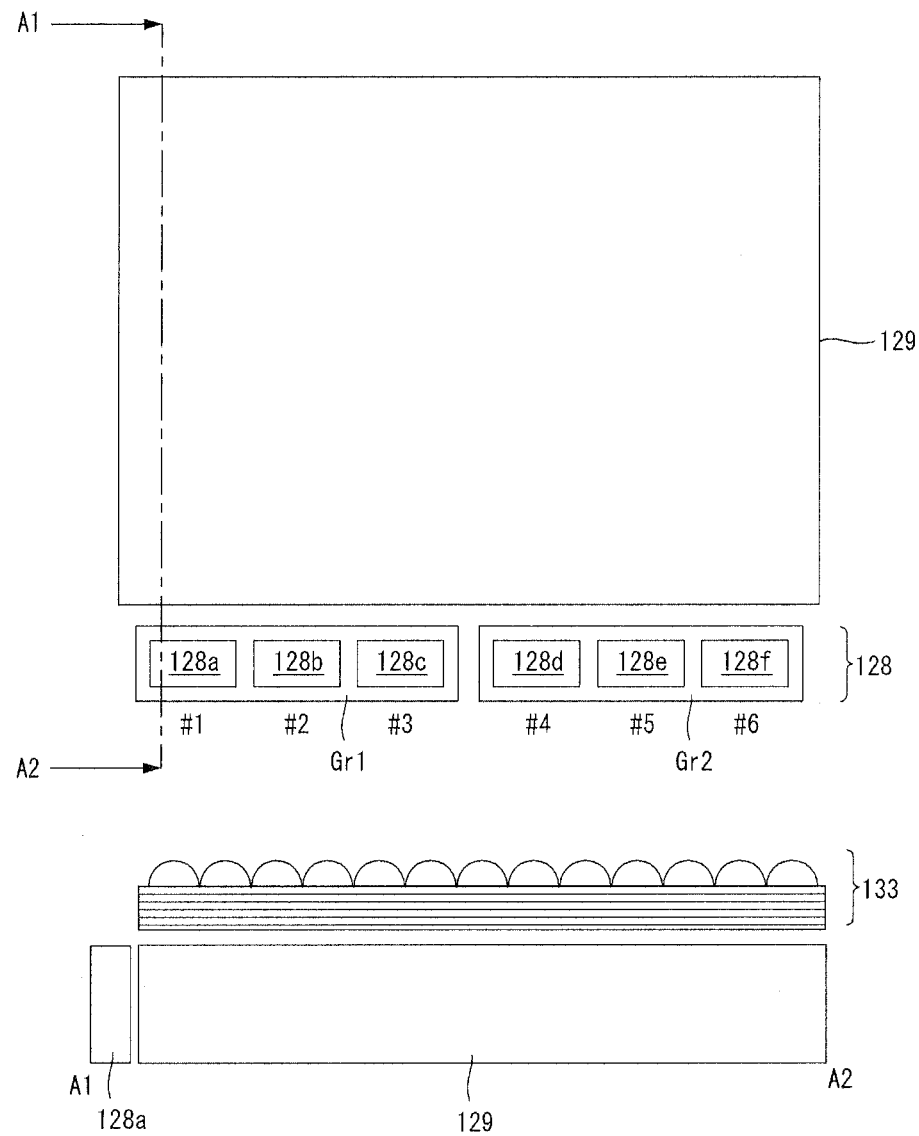
FIG. 6 is a view for explaining an edge type backlight unit.

FIG. 6 is a view for explaining an edge type backlight unit. FIGS. 7 to 10 are illustrations of a local dimming mode of the edge type backlight unit. FIG. 11 is another illustration of a light guide plate.

As shown in FIG. 6, the edge type backlight unit comprises light sources 128 disposed at one side with respect to a liquid crystal display panel, a light guide plate 129 for guiding light generated from the light sources 128 to the liquid crystal display panel, and optical members 133 for effectively supplying the light emitted from the light guide plate 129 to the liquid crystal panel. Although the exemplary embodiment has been described as one example in which each of the optical members 133 comprise a microlens sheet, the present invention is not limited thereto. The light sources 128 will be illustrated, taking an example in which first to sixth light sources 128a to 128f are arranged in two light source groups Gr1 and Gr2. Referring to FIG. 3 together, the first and second light source groups Gr1 and Gr2 of the exemplary embodiment can be driven by first and second light source drivers 145a and 145b, respectively. When the first and second light source groups Gr1 and Gr2 of the exemplary embodiment operate in the local dimming mode, they emit light as follows.

Example 1 of Local Dimming Mode of Edge Type Backlight Unit

Figure 7:
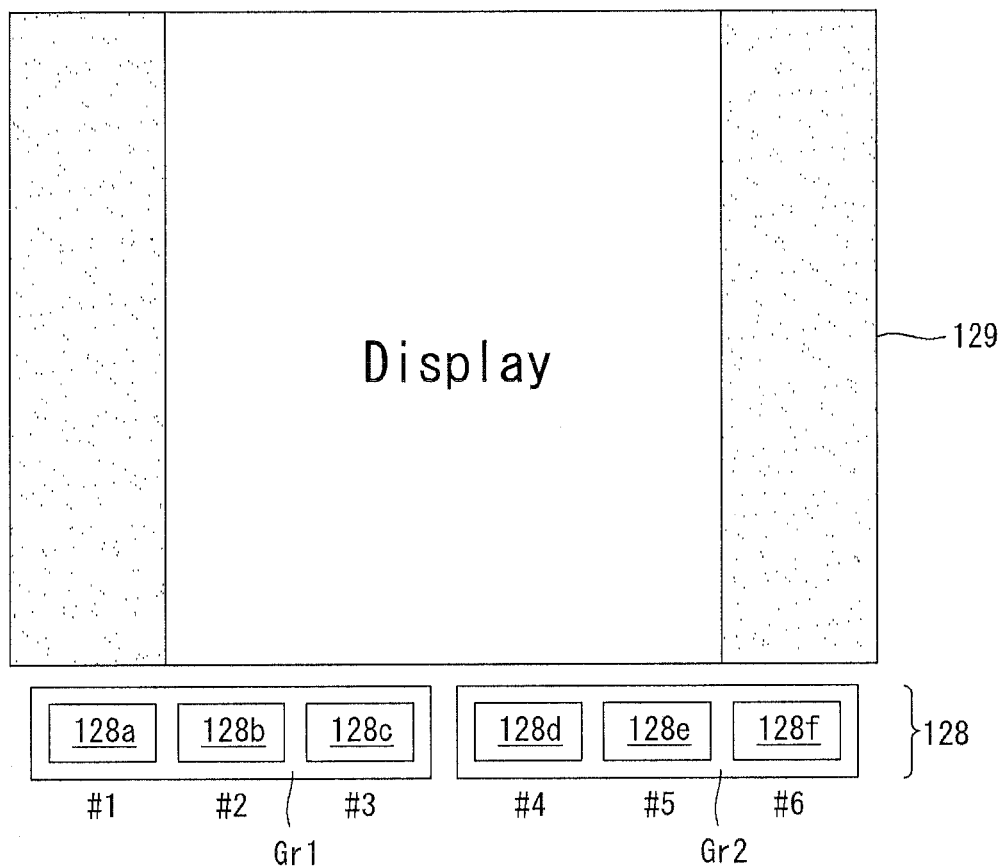
FIGS. 7 to 10 are illustrations of a local dimming mode of the edge type backlight unit.

As shown in FIG. 7, the second to fifth light sources 128b to 128e, except for the first light source 128a included in the first light source group Gr1 and the sixth light source 128f included in the second light source group Gr2, emit light. An example of such light emission of the backlight unit corresponds to a case where the screen ratio of an image to be displayed on the liquid crystal display panel changes from 16:9 to 4:3. That is, conventionally, even when a user adjusts the screen ratio displayed on the liquid crystal display panel to 4:3 when watching a movie or the like, all the backlight units emit light. However, as shown in the exemplary embodiment, when the first light source 128a and the sixth light source 128f positioned in an area except for the area corresponding to the screen ratio of 4:3 are operated in the local dimming mode not to emit light, power consumption can be effectively reduced. The number of light emitting parts of the first to sixth light sources 128a to 128f included in the first and second light source groups Gr1 and Gr2 may be varied to be appropriate for the ratio of 4:3, but is not limited thereto. Meanwhile, the local dimming mode of the exemplary embodiment performs control such that an image display area and an image non-display area are divided and only the light sources included in a light source group corresponding to the image non-display area can emit light, as well as changing the screen ratio.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to a changed screen ratio based on the dimming signals DOS and DIM and the dimming control signal SCM, and supplies it to the first light source driver 145a and the second light source driver 145b. Then, the first and second light source drivers 145a and 145b make the second to fifth light sources 128b to 128e included in the first light source group Gr1 and the second light source group Gr2 emit light as shown in FIG. 7 based on the light source drive signal SCD.

Example 2 of Local Dimming Mode of Edge Type Backlight Unit

Figure 8:
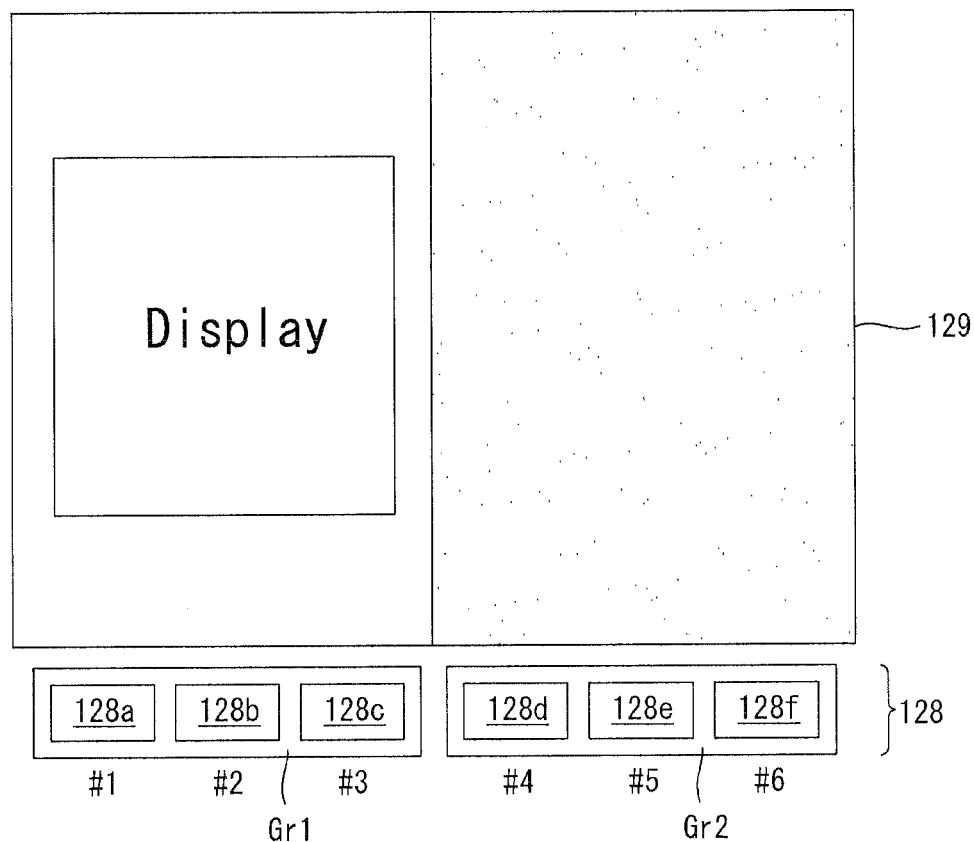

As shown in FIG. 8, the first light source group Gr1 and the second light source group Gr2 emit light at different brightness. An example of such light emission of the backlight unit corresponds to a case where high-definition images, such as video (or still image) are displayed on the left area of the liquid crystal display panel and low-definition images, such as characters, numbers, etc., are displayed on the right area of the liquid crystal display panel. That is, conventionally, when a user watches video while working on a document by dividing the liquid crystal display panel into two, all the backlight units emit light at the same brightness. However, as in the exemplary embodiment, by operating the first light source group Gr1 and the second light source group Gr2 at different brightness in the local dimming mode in accordance with their corresponding areas, power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the image quality displayed on the screen by area based on the dimming signals DOS and DIM and the dimming control signal SCM, and supplies it to the first light source driver 145a and the second light source driver 145b. Then, the first and second light source drivers 145a and 145b make the first to sixth light sources 128a to 128f included in the first light source group Gr1 and the second light source group Gr2 emit light at different brightness as shown in FIG. 8 based on the light source drive signal SCD.

Example 3 of Local Dimming Mode of Edge Type Backlight Unit

Figure 9:
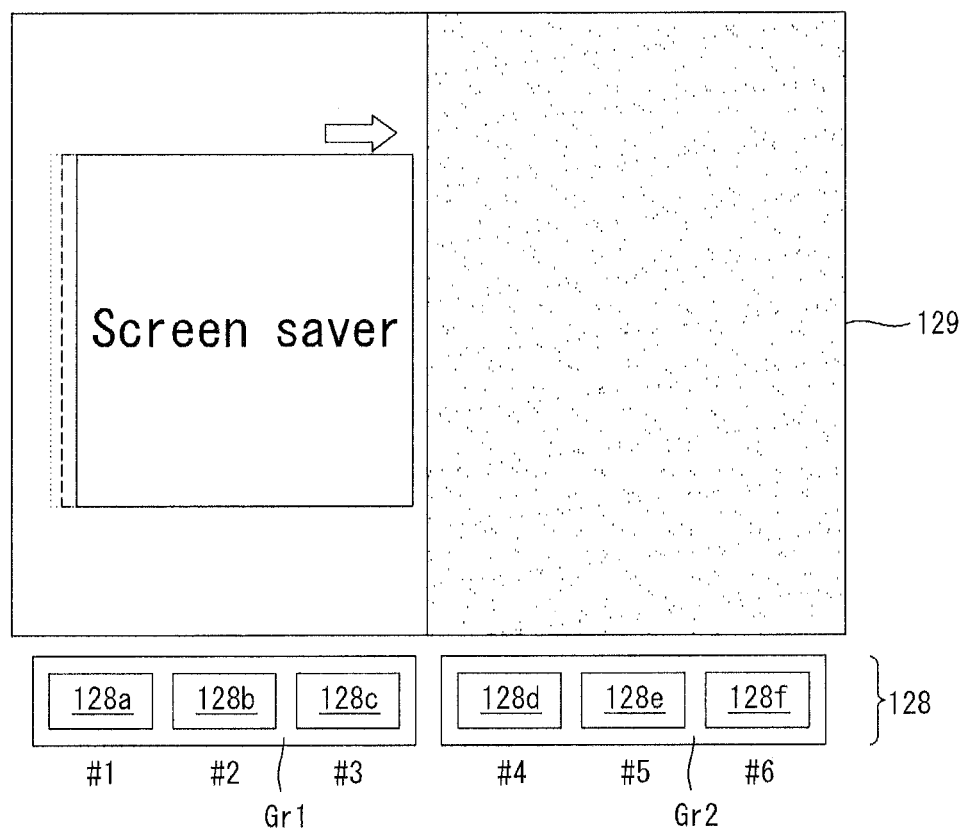
Figure 10:
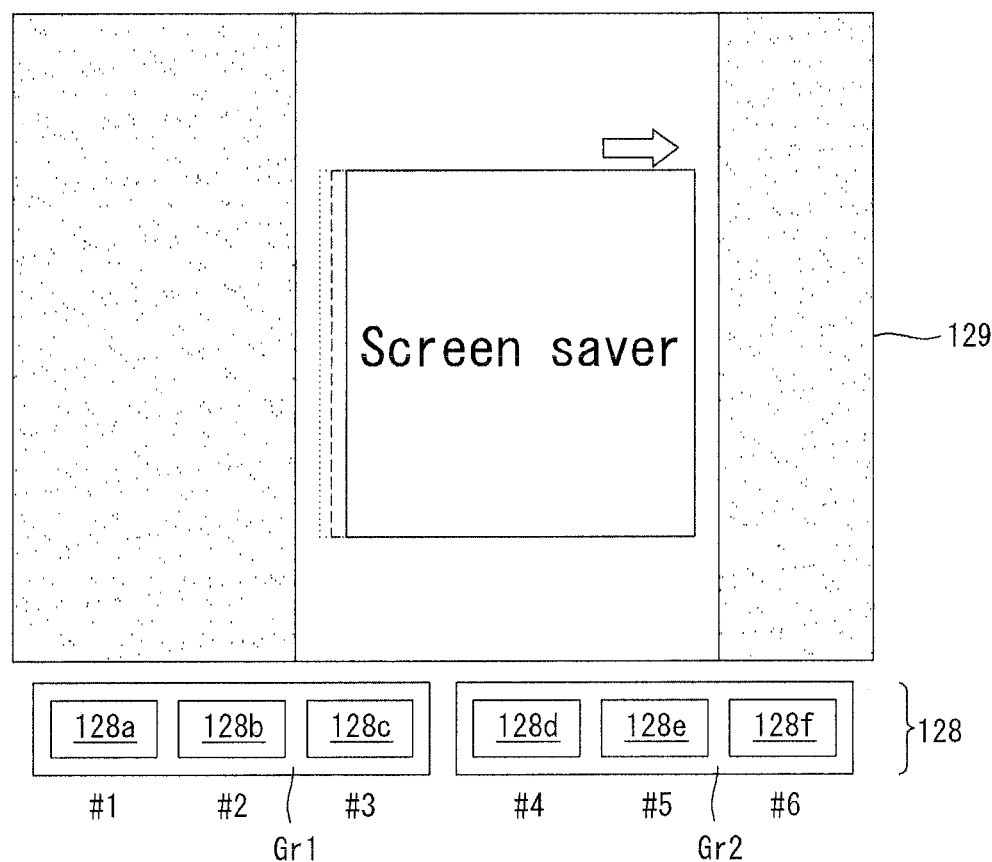

As shown in FIGS. 9 and 10, the first to sixth light sources 128a to 128f included in the first light source group Gr1 and the second light source group Gr2 emit light according to the area occupied by a moving image. An example of such light emission of the backlight unit corresponds to a case where an image, such as a screen saver, moving to a particular position is displayed on the liquid crystal display panel. That is, conventionally, even if the screen saver is moved to a particular position and displayed there, all the backlight units emit light at the same brightness. However, as in the exemplary embodiment, by operating the light sources 128a to 128f included in the first light source group Gr1 and the second light source group Gr2 in the local dimming mode so that some of them emit light or not in accordance with the area where the screen saver moves the screen saver, power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the motion of an image to be displayed on the screen based on the dimming signals DOS and DIM and the dimming control signal SCM, and supplies it to the first light source driver 145a and the second light source driver 145b. Then, the first and second light source drivers 145a and 145b make part of the first to sixth light sources 128a to 128f included in the first light source group Gr1 and the second light source group Gr2 emit light or not as shown in FIGS. 9 and 10 based on the light source drive signal SCD.

In the above-described edge type backlight unit, a light guide plate 129 including a pattern Pt for dividing the first to sixth light sources 128a to 128f by area may be used as shown in FIG. 11 in order to prevent the light emitted from one light source 128a from being distributed to the area of the neighboring light source 128b or interfered when the light sources 128 are operated in the local dimming mode. The pattern Pt included in the light guide plate 129 may be formed to be narrow in a lower portion and wide in an upper portion as shown in (a) of FIG. 11. In contrast, the pattern Pt included in the light guide plate 129 may be formed to be wide in a lower portion and narrow in an upper portion as shown in (b) of FIG. 11. Otherwise, the pattern Pt included in the light guide plate 129 may be formed to have the same width in both upper and lower portions as shown in (c) of FIG. 11.

Hereinafter, the configuration of a display device comprising an edge type backlight unit will be described.

Figure 12:
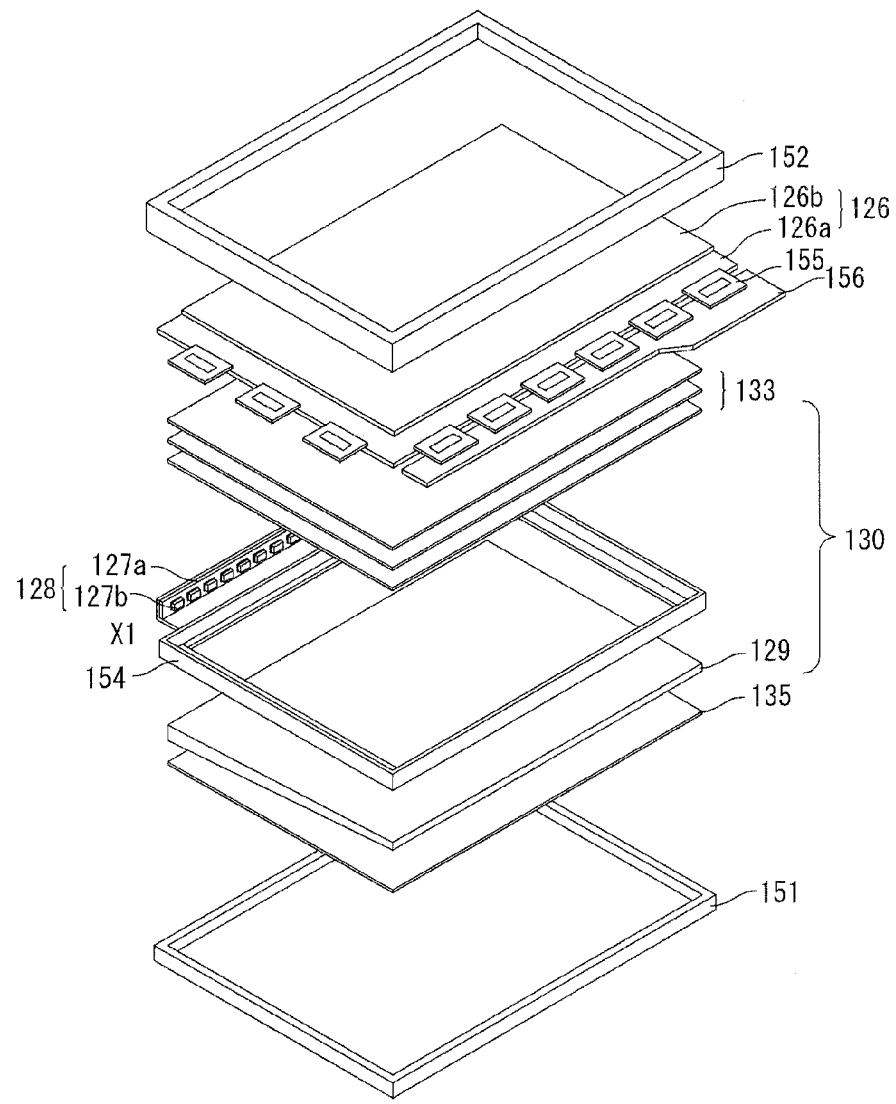
FIG. 12 is a perspective view of a display device comprising the edge type backlight unit.

FIG. 12 is a perspective view of a display device comprising the edge type backlight unit.

As shown in FIG. 12, the display device comprises a liquid crystal display panel 126 and an edge type backlight unit 130 which are positioned between a rear cover 151 and a front cover 152. The liquid crystal display panel 126 comprises a transistor substrate 126a and a color filter substrate 126b joined together with a liquid crystal layer therebetween. Data lines and gate lines constituting a pixel array of the liquid crystal display panel 126 are electrically connected to a printed circuit board 156 via a flexible film 155 and are supplied with various drive signals.

The edge type backlight unit 130 of the exemplary embodiment 130 comprises light sources 128, a light guide plate 129, a reflection plate 135, and an optical member 133. The light sources 128 included in the edge type backlight unit 130 are disposed at a first side X1 with respect to the liquid crystal display panel 126, and comprise light emitting parts 127b mounted on a light source substrate 127a. The edge type backlight unit 130 may comprise a bottom cover 154 for supporting the optical member 133 or the like, but the bottom cover 154 may be omitted according to a structure. In the edge type backlight unit 130, light incident through the light guide plate 129 is supplied to the liquid crystal display panel 126 through the optical member 133. Here, the reflection plate 135 under the light guide plate 129 serves to cause light reflection or the like so that the light incident on the light guide plate 129 is supplied in the direction of the liquid crystal display panel 126. The optical member 133 above the light guide plate 129 serves to increase light output so that the light incident through the light guide plate 129 is efficiently supplied in the direction of the liquid crystal display panel 126.

As such, the display device comprising the edge type backlight unit 130 can display a specific image on the liquid crystal display panel 126 using the light emitted from the light sources 128 disposed at one side X1 with respect to the liquid crystal display panel 126.

[Dual Type Backlight Unit]

Figure 13:
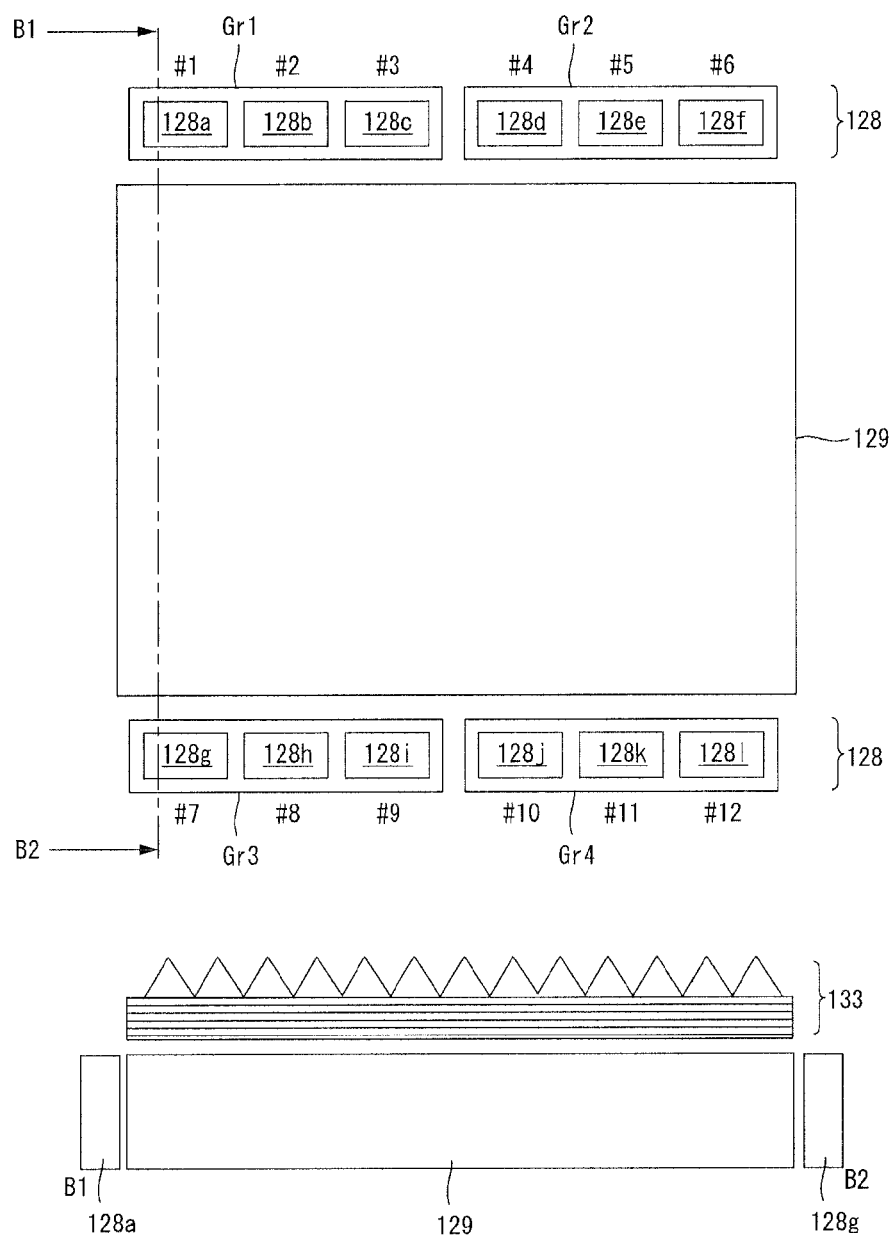
FIG. 13 is a view for explaining a dual type backlight unit
Figure 19:
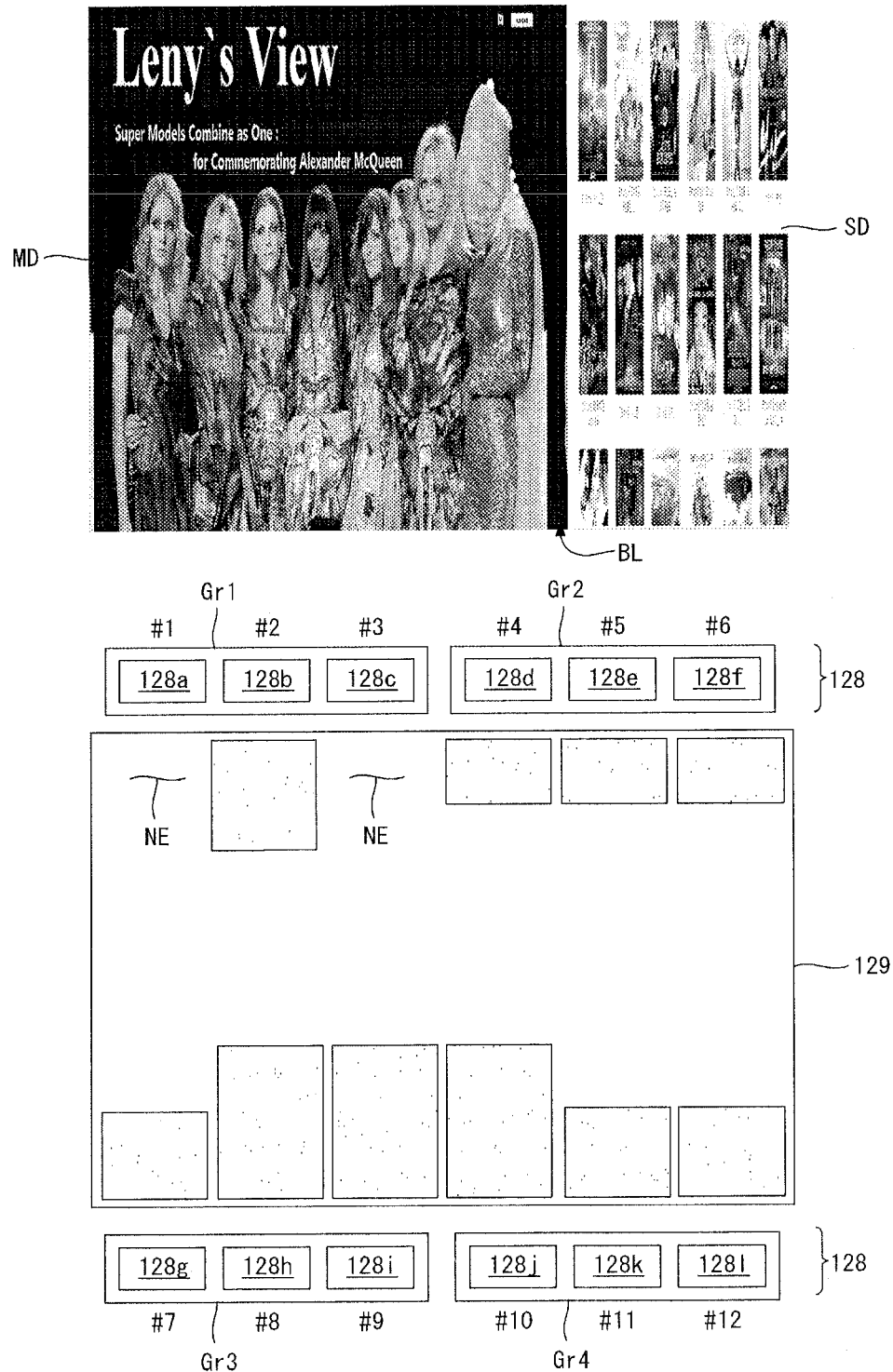
Figure 20:
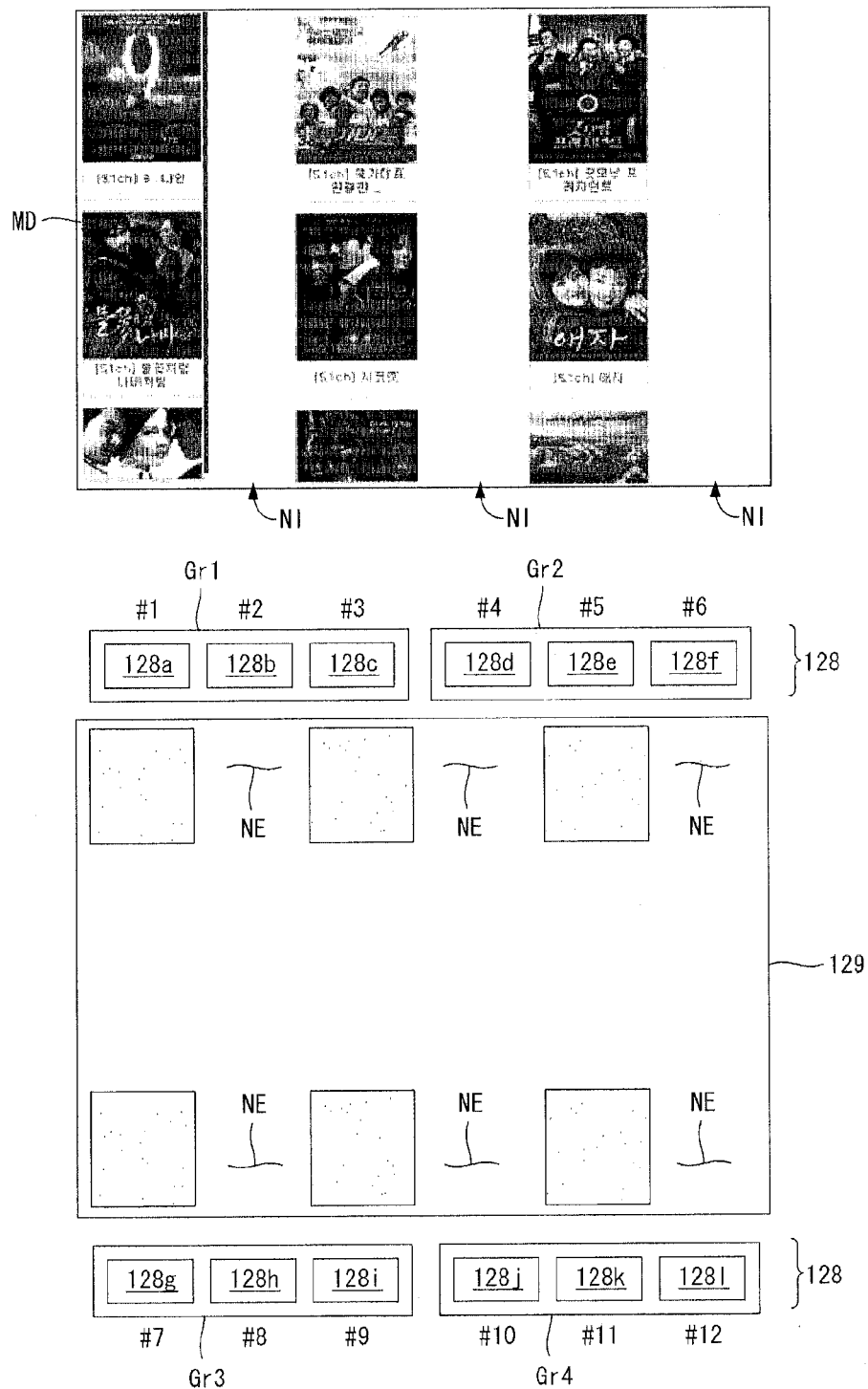
Figure 21:
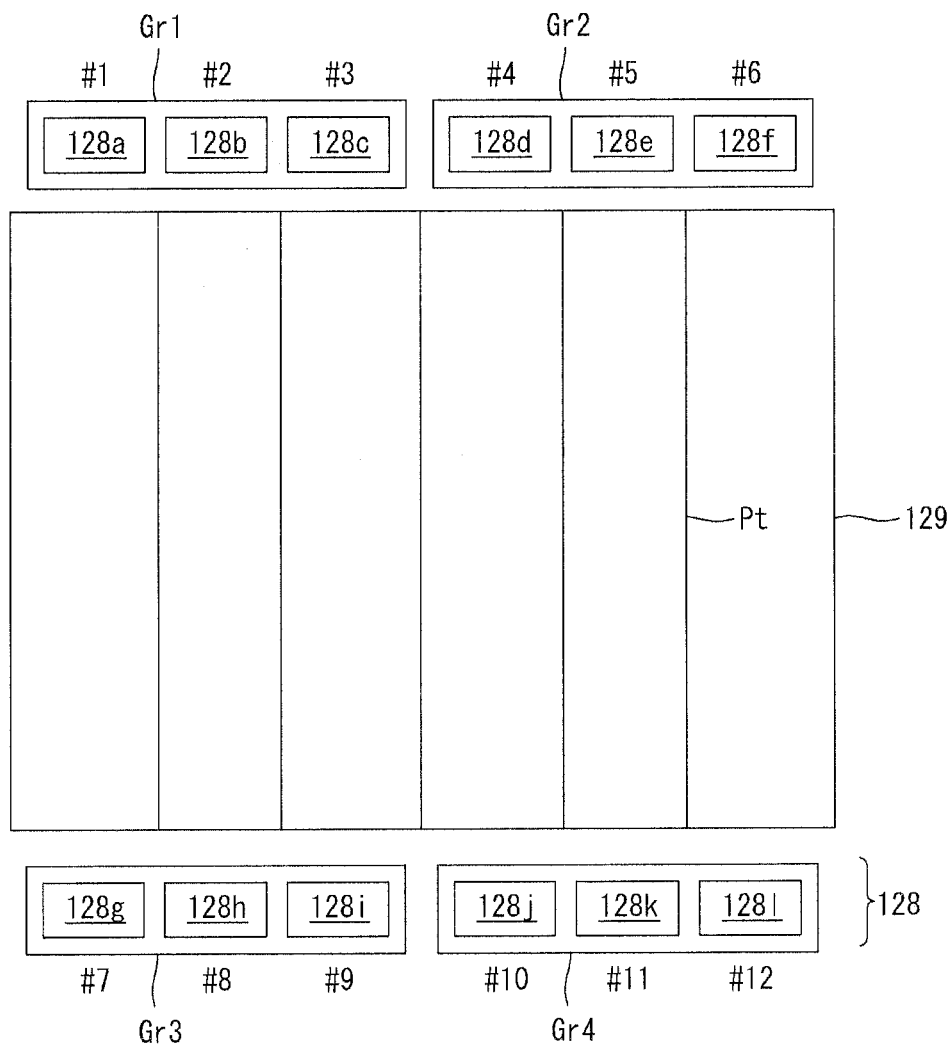
FIG. 21 is another illustration of a light guide plate.

FIG. 13 is a view for explaining a dual type backlight unit. FIGS. 14 to 17 are illustrations of a local dimming mode of the dual type backlight unit. FIGS. 18 to 20 are another illustrations of the local dimming mode of the dual type backlight unit. FIG. 21 is another illustration of a light guide plate.

As shown in FIG. 13, the dual type backlight unit comprises light sources 128 disposed facing each other at first and second sides with respect to a liquid crystal display panel, a light guide plate 129 for guiding light generated from the light sources 128 to the liquid crystal display panel, and optical members 133 for effectively supplying the light emitted from the light guide plate 129 to the liquid crystal display panel. Although the exemplary embodiment has been described as one example in which each of the optical members 133 comprise a microlens sheet, the present invention is not limited thereto. The light sources 128 will be illustrated, taking an example in which first to twelfth light sources 128a to 128l are arranged in four light source groups Gr1 to Gr4. Referring to FIG. 3 together, the first to fourth light source groups Gr1 to Gr4 of the exemplary embodiment can be driven by first and second light source drivers 145a and 145b, respectively. When the first to fourth light source groups Gr1 to Gr4 of the exemplary embodiment operate in the local dimming mode, they emit light as follows. Meanwhile, the first to twelfth light sources 128a to 128l included in the four light source groups Gr1 to Gr4 constituting the dual type backlight unit emit light by forming pairs of light sources disposed facing each other, e.g., a pair of the first light source 128a and the seventh light source 128g.

Example 1 of Local Dimming Mode of Dual Type Backlight Unit

Figure 14:
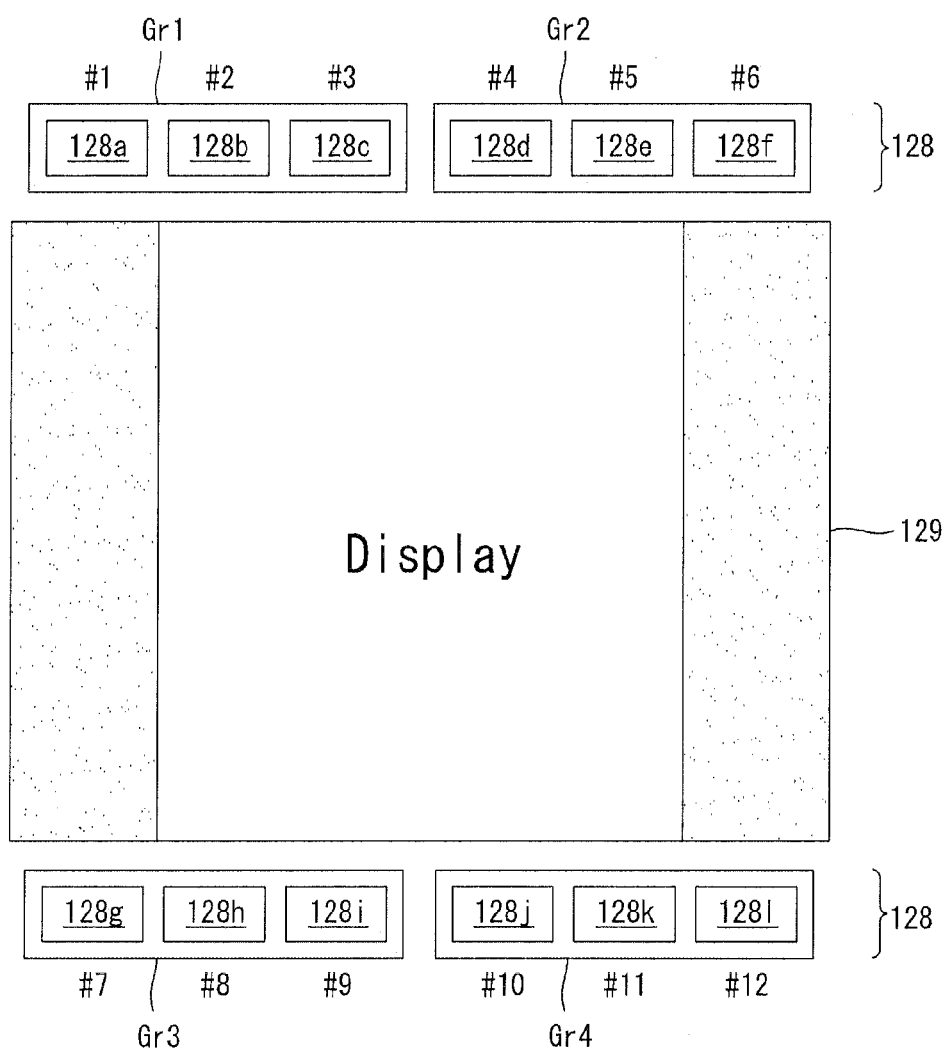
FIGS. 14 to 17 are illustrations of a local dimming mode of the dual type backlight unit.

As shown in FIG. 14, the second to fifth light sources 128b to 128e and eighth to eleventh light sources 128b to 128e and 128h to 128k, except for the first light source 128a and seventh light source 128g included in the first light source group Gr1 and third light source group Gr3 and the sixth light source 128f and twelfth light source 128l included in the second light source group Gr2 and fourth light group Gr4, emit light. An example of such light emission of the backlight unit corresponds to a case where the screen ratio of an image to be displayed on the liquid crystal display panel changes from 16:9 to 4:3. That is, conventionally, even when a user adjusts the screen ratio displayed on the liquid crystal display panel to 4:3 when watching a movie or the like, all the backlight units emit light. However, as shown in the exemplary embodiment, when the first light source 128a, the seventh light source 128g, the sixth light source 128f, and the twelfth light source 128l positioned in an area except for the area corresponding to the screen ratio of 4:3 are operated in the local dimming mode not to emit light, power consumption can be effectively reduced. The number of light emitting parts of the first to twelfth light sources 128a to 128l included in the first to fourth light source groups Gr1 to Gr4 may be varied to be appropriate for the ratio of 4:3, but is not limited thereto. Meanwhile, the local dimming mode of the exemplary embodiment performs control such that an image display area and an image non-display area are divided and only the light sources included in a light source group corresponding to the image non-display area can emit light, as well as changing the screen ratio.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to a changed screen ratio based on the dimming signals DOS and DIM and the dimming control signal SCM, and supplies it to the first to fourth light source drivers 145a to 145d. Then, the first to fourth light source drivers 145a to 145d make the first to twelfth light sources 128a to 128l included in the first to fourth light source groups Gr1 to Gr4 emit light as shown in FIG. 14 based on the light source drive signal SCD.

Example 2 of Local Dimming Mode of Dual Type Backlight Unit

Figure 15:
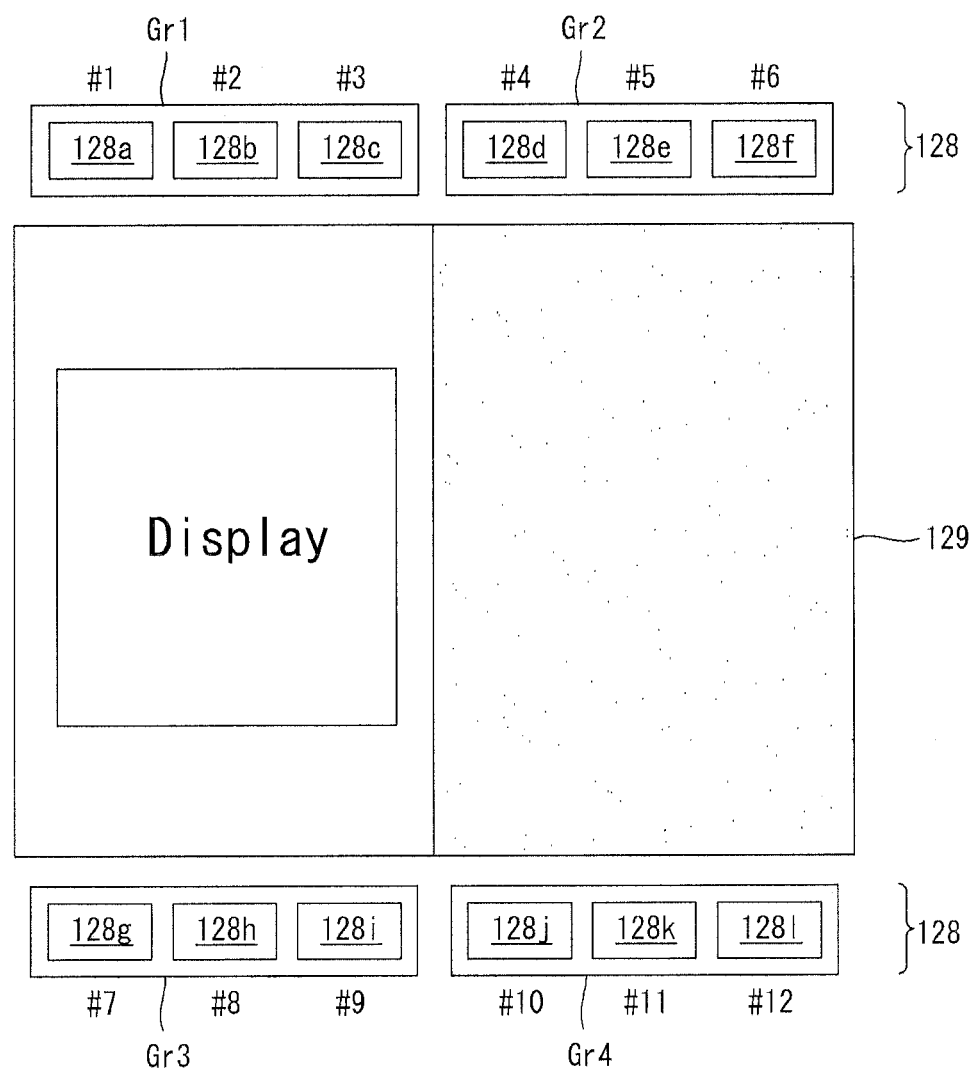

As shown in FIG. 15, the first and third light source groups Gr1 and Gr3 and the second and fourth light source groups Gr2 and Gr4 emit light at different brightness. An example of such light emission of the backlight unit corresponds to a case where high-definition images, such as video (or still image) are displayed on the left area of the liquid crystal display panel and low-definition images, such as characters, numbers, etc., are displayed on the right area of the liquid crystal display panel. That is, conventionally, when a user watches video while working on a document by dividing the liquid crystal display panel into two, all the backlight units emit light at the same brightness. However, as in the exemplary embodiment, by operating the first and third light source groups Gr1 and Gr3 and the second and fourth light source groups Gr2 and Gr4 at different brightness in the local dimming mode in accordance with their corresponding areas, power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the image quality displayed on the screen by area based on the dimming signals DOS and DIM and the dimming control signal SCM, and supplies it to the first to fourth light source drivers 145a to 145d. Then, the first to fourth light source drivers 145a to 145d make the first to eleventh light sources 128a to 128l included in the first to fourth light source groups Gr1 to Gr4 emit light at different brightness as shown in FIG. 15 based on the light source drive signal SCD.

Example 3 of Local Dimming Mode of Dual Type Backlight Unit

Figure 16:
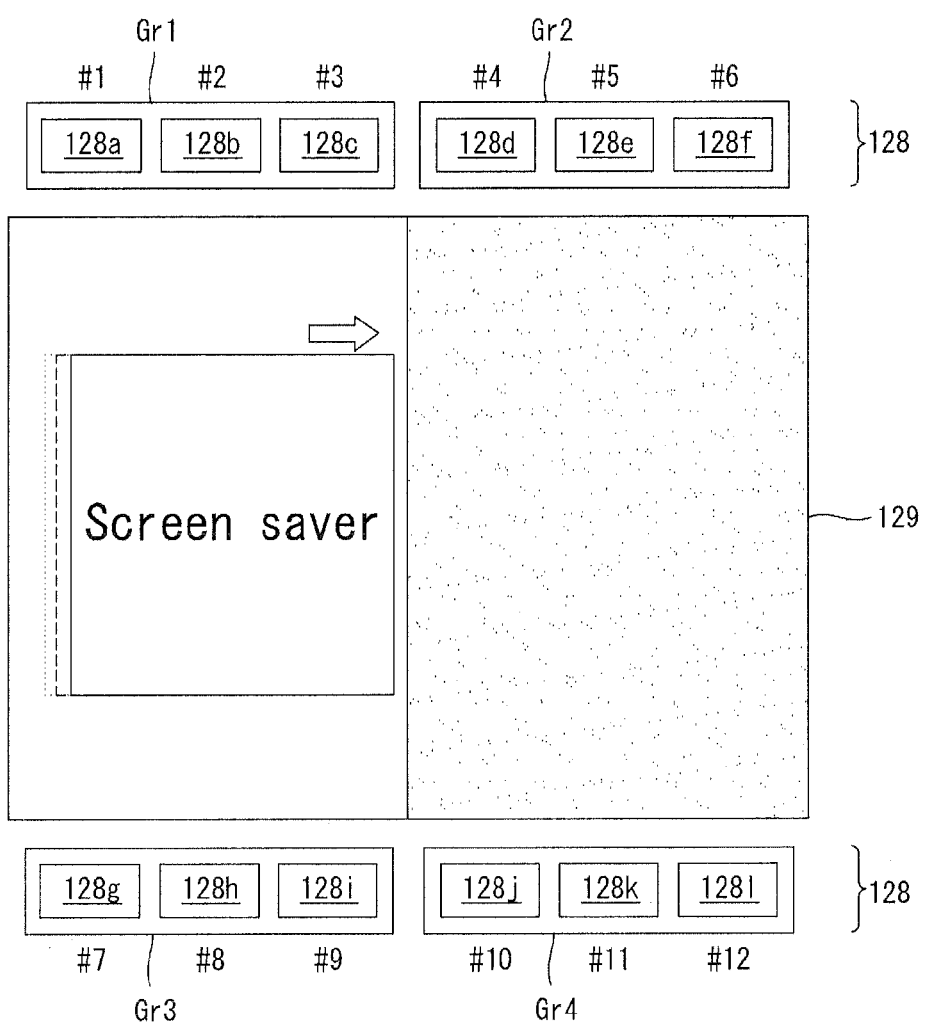
Figure 17:
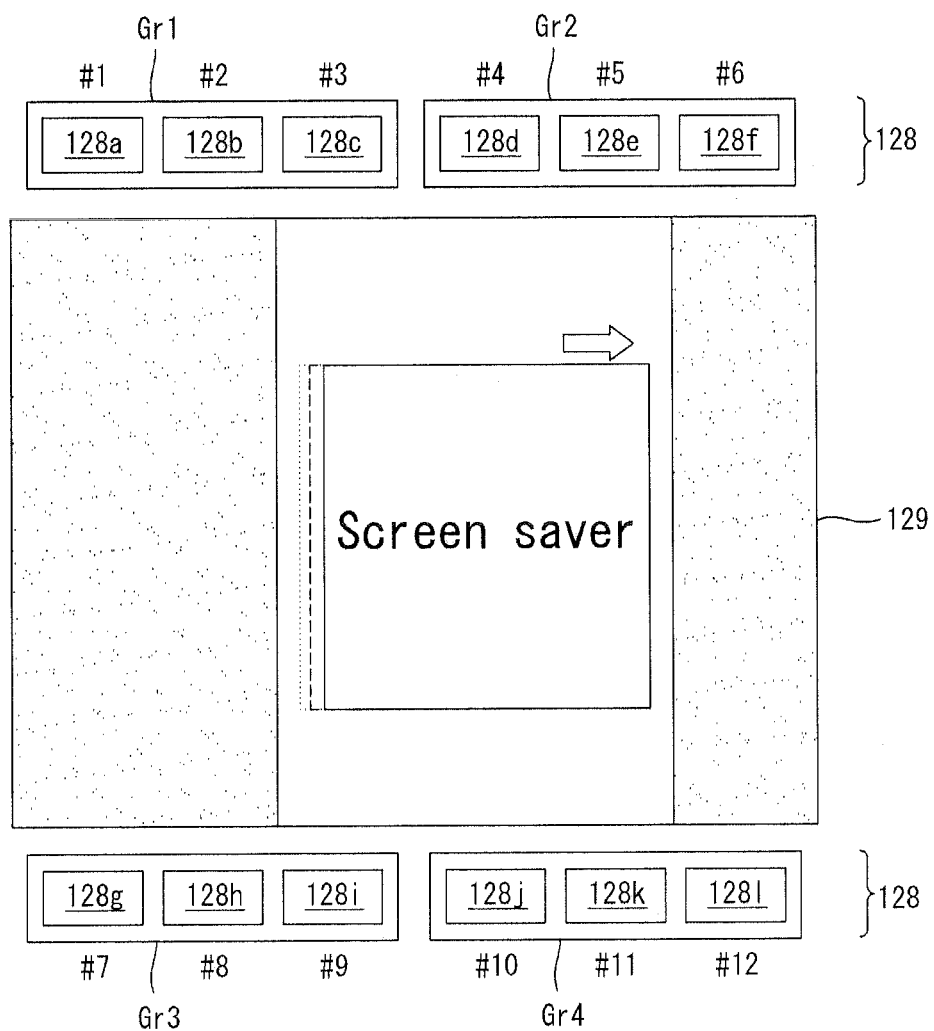

As shown in FIGS. 16 and 17, the first to twelfth light sources 128a to 128l included in the first to fourth light source groups Gr1 to Gr4 emit light according to the area occupied by a moving image. An example of such light emission of the backlight unit corresponds to a case where an image, such as a screen saver, moving to a particular position is displayed on the liquid crystal display panel. That is, conventionally, even if the screen saver is moved to a particular position and displayed there, all the backlight units emit light at the same brightness. However, as in the exemplary embodiment, by operating the first to twelfth light sources 128a to 128l included in the first to fourth light source groups Gr1 to Gr4 in the local dimming mode so that some of them emit light or not in accordance with a moving area of the screen saver, power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the motion of an image to be displayed on the screen based on the dimming signals DOS and DIM and the dimming control signal SCM, and supplies it to the first to fourth light source drivers 145a to 145d. Then, the first to fourth light source drivers 145a to 145d make part of the first to twelfth light sources 128a to 128l included in the first to fourth light source groups Gr1 to Gr4 emit light or not as shown in FIGS. 16 and 17 based on the light source drive signal SCD.

Example 4 of Local Dimming Mode of Dual Type Backlight Unit

As shown in FIG. 18, the first and third light sources 128a and 128c included in the first light source group Gr1 does not emit light, whereas the second light source 128b included in the first light source group Gr1 and the fourth to twelfth light sources 128d to 128l included in the second to fourth light source groups Gr2 to Gr4 all emit light. However, the brightness of the second light source 128b is different from that of the fourth to twelfth light sources 128d to 128l. In FIG. 18, the difference in brightness between the second light source 128b and the fourth to twelfth light sources 128d to 128l is indicated by the sizes of blocks shown in their corresponding areas.

An example of such light emission of the backlight unit corresponds to a case where a difference in luminance by area is required to increase the contrast ratio of a main display MD to be displayed on the entire liquid crystal display panel. That is, conventionally, all the backlight units emit light at the same brightness regardless of the contrast ratio of the main display MD to be displayed on the entire liquid crystal display panel. However, as shown in the exemplary embodiment, in order to increase the contrast ratio or the like of the main display MD, part 128a and 128c of the first to twelfth light sources 128a to 128l included in the first to fourth light source groups Gr1 to Gr4 are made to emit light so as to exhibit a difference in luminance by area. Together with this, when the emitted light sources 128b and 128d to 128l, among the first to twelfth light sources 128a to 128l, are operated in the local dimming mode so as to exhibit a difference in brightness by area, display quality can be increased and power consumption can be effectively reduced. In further explanation, the backlight unit of the exemplary embodiment can make the light sources included in one light source group emit light or not, and can adjust the brightness between the emitted light sources. Therefore, the fine image control of even a small area is enabled by displaying an image on the liquid crystal display panel using the backlight unit of the exemplary embodiment, thereby enabling more precise local dimming and reducing power consumption.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the contrast ratio of a main display to be displayed on the screen based on the dimming signals DOS and DIM and the dimming control signal SCM, and supplies it to the first to fourth light source drivers 145a to 145d. Then, the first to fourth light source drivers 145a to 145d make part of the first to twelfth light sources 128a to 128l included in the first to fourth light source groups Gr1 to Gr4 emit light or not as shown in FIG. 18 based on the light source drive signal SCD, and the emitted light sources have different brightness.

Example 5 of Local Dimming Mode of Dual Type Backlight Unit

As shown in FIG. 19, the first and third light sources 128a and 128c included in the first light source group Gr1 does not emit light, whereas the second light source 128b included in the first light source group Gr1 and the fourth to twelfth light sources 128d to 128l included in the second to fourth light source groups Gr2 to Gr4 all emit light. However, the brightness of the second light source 128b is different from that of the fourth to twelfth light sources 128d to 128l, and the brightness difference is with respect to a borderline BL between a main display MD and a sub display SD to be displayed on the liquid crystal display panel. In FIG. 19, the difference in brightness between the second light source 128b and the fourth to twelfth light sources 128d to 128l is indicated by the sizes of blocks shown in their corresponding areas. As shown therein, the emitted fifth, sixth, eleventh, and twelfth light emitting parts 128e, 128f, 128k, and 128l have a lower brightness than the second, fourth, seventh, eighth, ninth, and tenth light emitting parts 128b, 128d, and 128g to 128j.

An example of such light emission of the backlight unit corresponds to a case where a difference in luminance by area is required to vary the contrast ratio between a main display MD and a sub display SD to be displayed on the entire liquid crystal display panel. That is, conventionally, all the backlight units emit light at the same brightness without varying the contrast ratio between the main display MD and sub display SD to be displayed on the entire liquid crystal display panel. However, as shown in the exemplary embodiment, in order to increase the contrast ratio or the like between the main display MD and the sub display SD, part 128a and 128c of the first to twelfth light sources 128a to 128l included in the first to fourth light source groups Gr1 to Gr4 are made to emit light so as to exhibit a difference in luminance by area. Together with this, when the emitted light sources 128b and 128d to 128l, among the first to twelfth light sources 128a to 128l, are operated in the local dimming mode so as to exhibit a difference in brightness by area, display quality can be increased and power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the contrast ratio of a main display to be displayed on the screen based on the dimming signals DOS and DIM and the dimming control signal SCM, and supplies it to the first to fourth light source drivers 145a to 145d. Then, the first to fourth light source drivers 145a to 145d make part of the first to twelfth light sources 128a to 128l included in the first to fourth light source groups Gr1 to Gr4 emit light or not as shown in FIG. 19 based on the light source drive signal SCD, and the emitted light sources have different luminance between the main display MD and the sub display SD.

Example 6 of Local Dimming Mode of Dual Type Backlight Unit

As shown in FIG. 20, the second, fourth, sixth, eighth, tenth, and twelfth light sources 128b, 128d, 128f, 128h, 128j, and 128l included in the first to fourth light source groups Gr1 to Gr4 do not emit light, whereas the remaining first, third, fifth, seventh, ninth, and eleventh light sources 128b, 128d, 128f, 128h, 128i, and 128l all emit light. Although FIG. 20 has illustrated that there is no brightness difference between the emitted first, third, fifth, seventh, ninth, and eleventh light sources 128b, 128d, 128f, 128h, 128i, and 128l, there may be a brightness difference between them.

An example of such light emission of the backlight unit corresponds to a case where a non-light emitting area and a light emitting area are arranged according to areas by dividing a main display MD to be displayed by area on part of the liquid crystal display panel into at least two with a non-image display area interposed therebetween. That is, conventionally, all the backlight units emit light at the same brightness even if a main display MD to be displayed by area is required for part of the liquid crystal display panel. However, as shown in the exemplary embodiment, if an image of the main display MD is displayed with a non-image display area NI in between, the light sources 128b, 128d, 128f, 128h, 128i, and 128l that can be made not to emit light, among the first to twelfth light sources 128a to 128l, are made to emit no light. Together with this, when the light sources 128b, 128d, 128f, 128h, 128i, and 128l positioned in the area where the main display MD is displayed are operated in the local dimming mode so as to emit light, power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the divided areas of the main display to be displayed on the screen based on the dimming signals DOS and DIM and the dimming control signal SCM, and supplies it to the first to fourth light source drivers 145a to 145d. Then, the first to fourth light source drivers 145a to 145d make part of the first to twelfth light sources 128a to 128l included in the first to fourth light source groups Gr1 to Gr4 emit light or not as shown in FIG. 20 based on the light source drive signal SCD, and the emitted light sources have different brightness.

In the above-described dual type backlight unit, a light guide plate 129 including a pattern Pt for dividing the light sources 128a, 128g to 128f, and 128l arranged in pairs by area may be used as shown in FIG. 21 in order to prevent the light emitted from one light source 128a from being distributed to the area of the neighboring light source 128b or interfered when the light sources 128 are operated in the local dimming mode.

Hereinafter, the configuration of a display device comprising a dual type backlight unit will be described.

Figure 22:
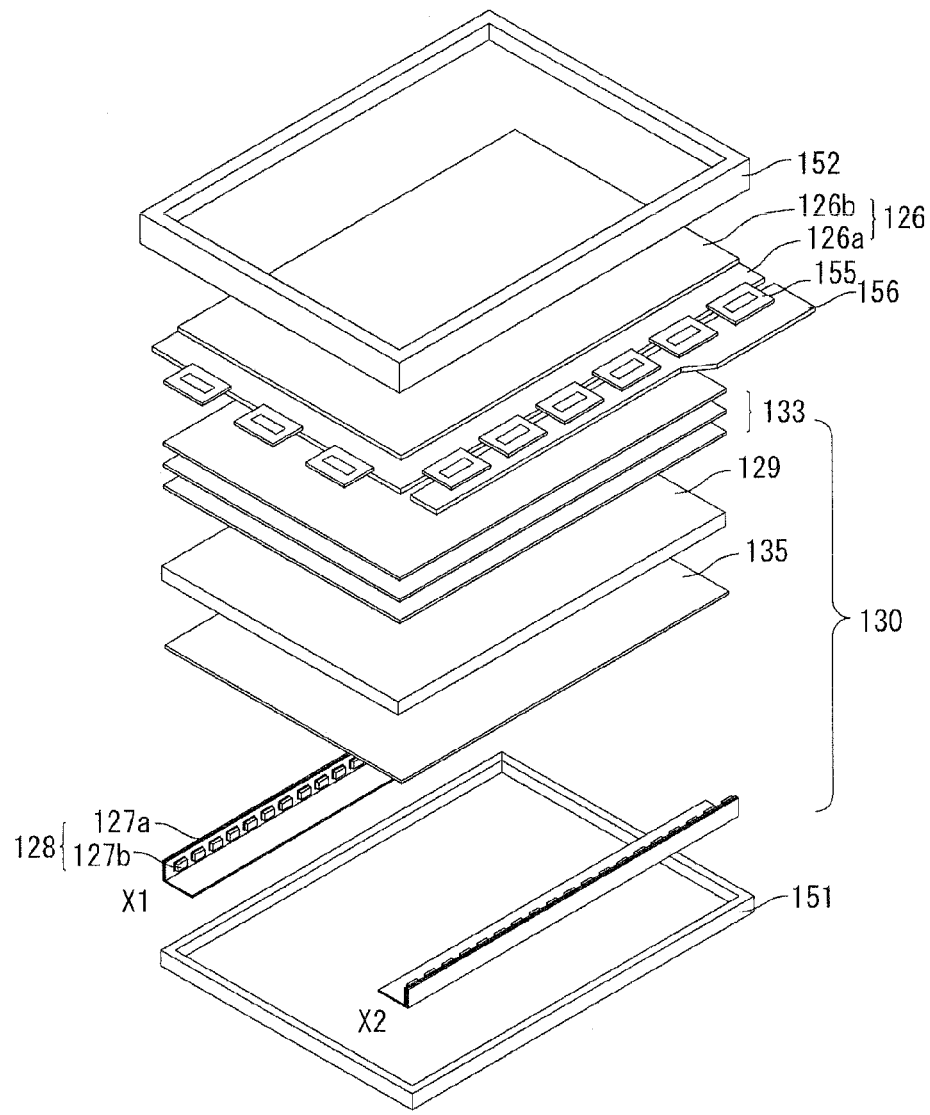
FIG. 22 is a perspective view of a display device comprising the dual type backlight unit.

FIG. 22 is a perspective view of a display device comprising the dual type backlight unit.

As shown in FIG. 22, the display device comprises a liquid crystal display panel 126 and a dual type backlight unit 130 which are positioned between a rear cover 151 and a front cover 152. The liquid crystal display panel 126 comprises a transistor substrate 126a and a color filter substrate 126b joined together with a liquid crystal layer therebetween. Data lines and gate lines constituting a pixel array of the liquid crystal display panel 126 are electrically connected to a printed circuit board 156 via a flexible film 155 and are supplied with various drive signals.

The dual type backlight unit 130 of the exemplary embodiment 130 comprises light sources 128, a light guide plate 129, a reflection plate 135, and an optical member 133. The light sources 128 included in the dual type backlight unit 130 are disposed at a first side X1 and a second side X2, respectively, with respect to the liquid crystal display panel 126, and comprise light emitting parts 127b mounted on a light source substrate 127a. In the dual type backlight unit 130, light incident through the light guide plate 129 is supplied to the liquid crystal display panel 126 through the optical member 133. Here, the reflection plate 135 under the light guide plate 129 serves to cause light reflection or the like so that the light incident on the light guide plate 129 is supplied in the direction of the liquid crystal display panel 126. The optical member 133 above the light guide plate 129 serves to increase light output so that the light incident through the light guide plate 129 is efficiently supplied in the direction of the liquid crystal display panel 126.

As such, the display device comprising the dual type backlight unit 130 can display a specific image on the liquid crystal display panel 126 using the light emitted from the light sources 128 disposed at the first side X1 and second side X2 with respect to the liquid crystal display panel 126.

[Quad Type Backlight Unit]

Figure 23:
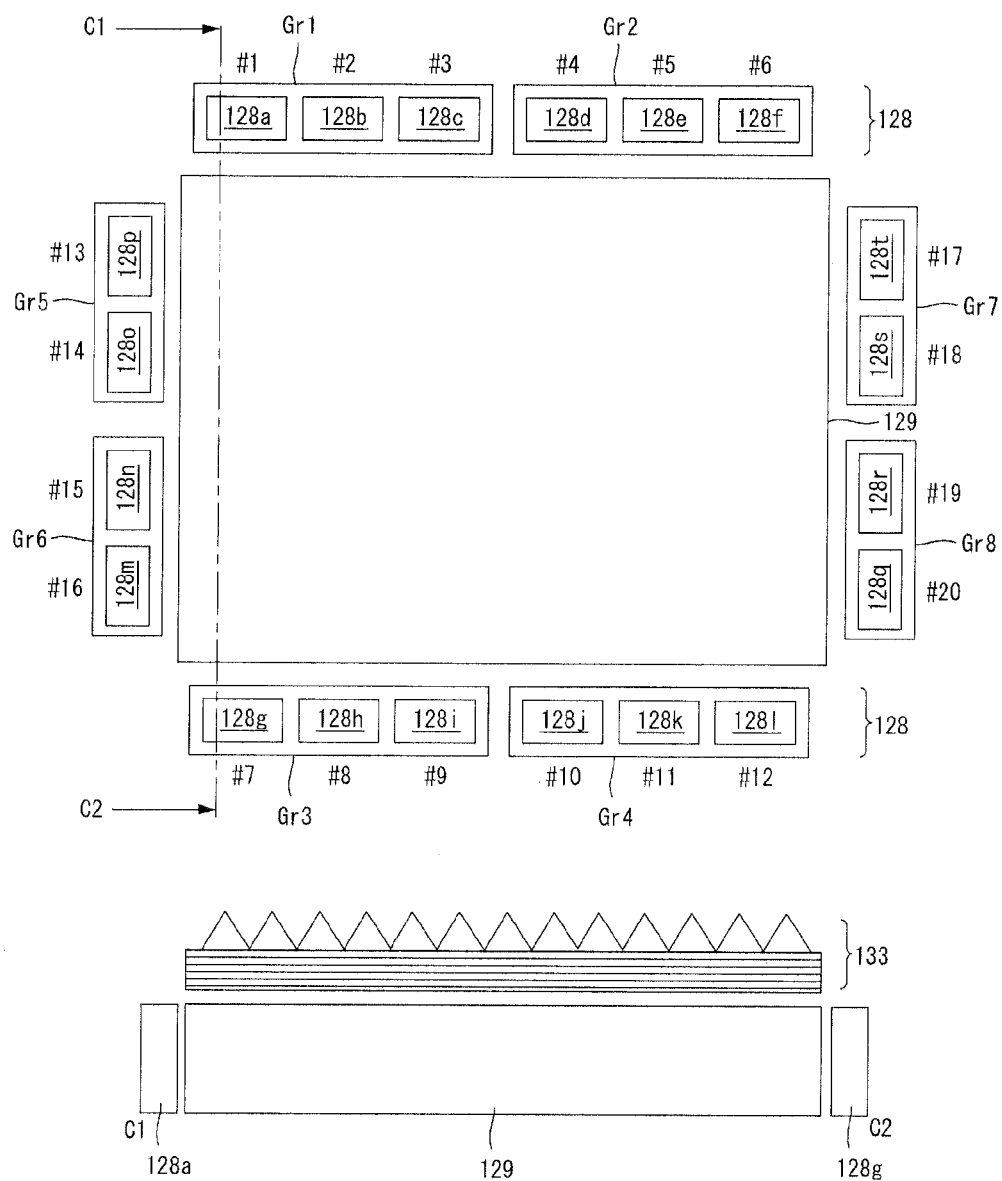
FIG. 23 is a view for explaining a quad type backlight unit.
Figure 24:
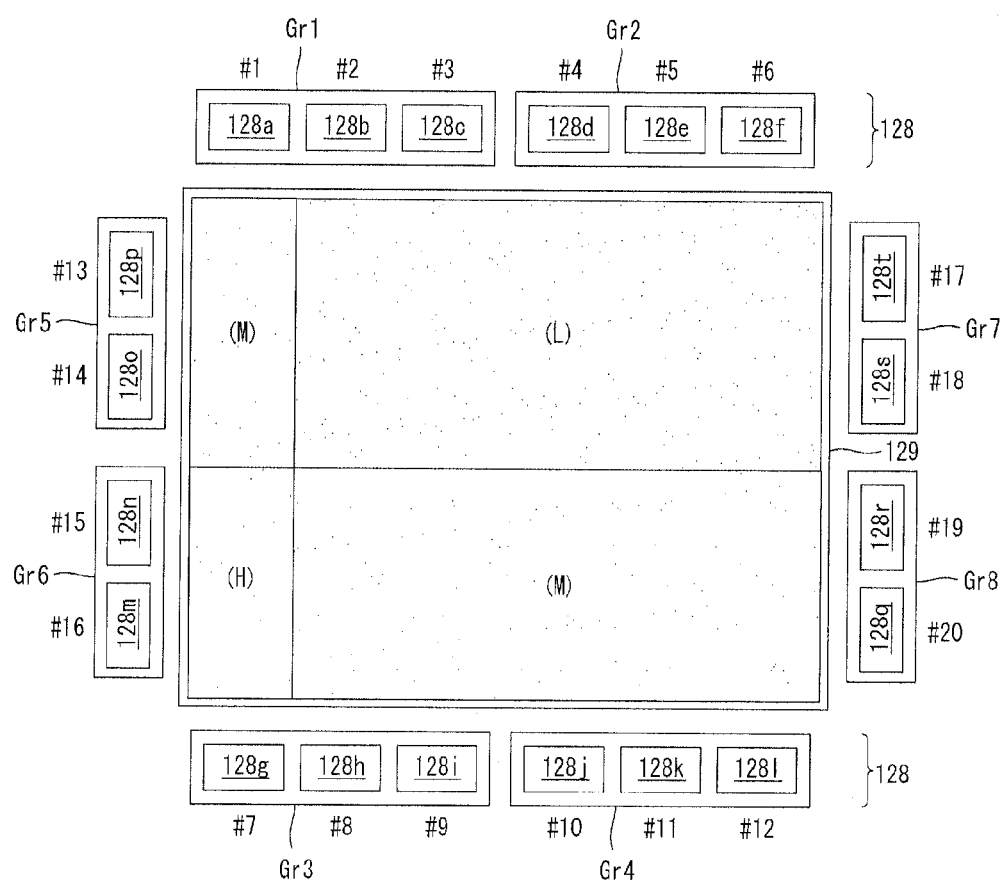
FIGS. 24 and 25 are illustrations of a local dimming mode of the quad type backlight unit.
Figure 25:
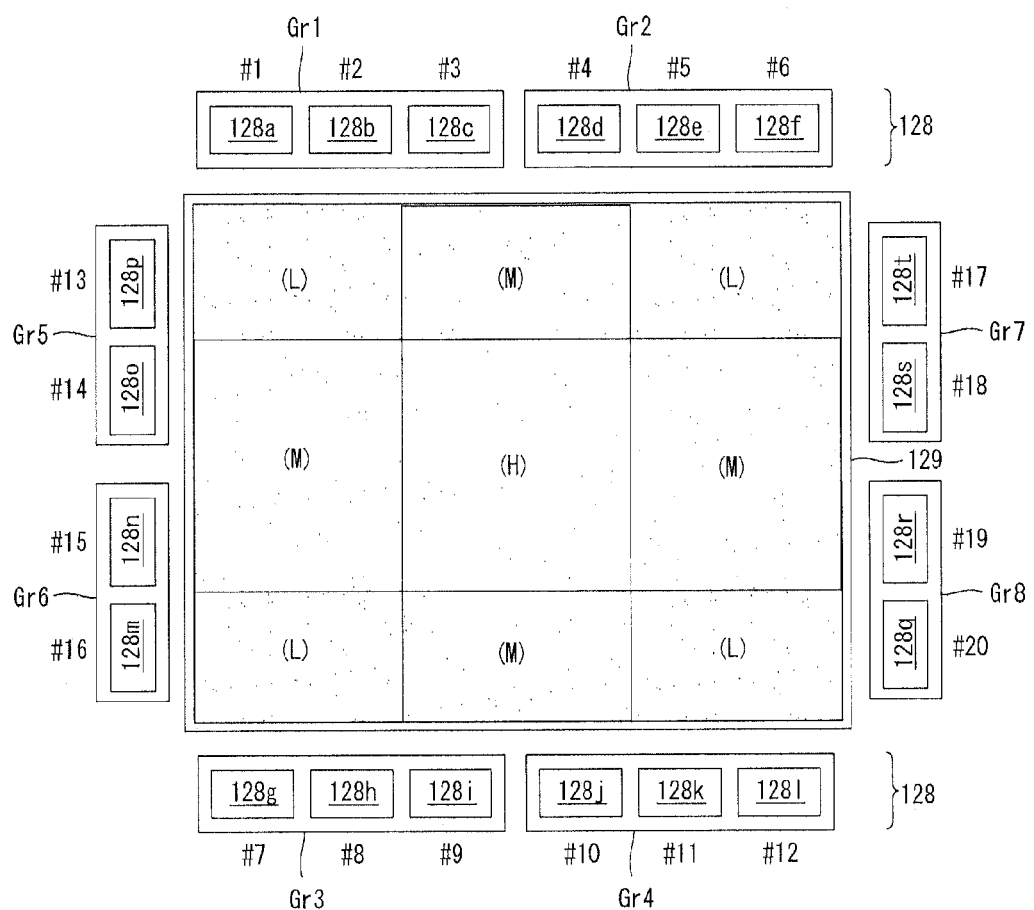

FIG. 23 is a view for explaining a quad type backlight unit. FIGS. 24 and 25 are illustrations of a local dimming mode of the quad type backlight unit.

As shown in FIG. 23, the quad type backlight unit comprises light sources 128 disposed facing each other at first, second, third, and fourth sides with respect to a liquid crystal display panel, a light guide plate 129 for guiding light generated from the light sources 128 to the liquid crystal display panel, and optical members 133 for effectively supplying the light emitted from the light guide plate 129 to the liquid crystal display panel. Although the exemplary embodiment has been described as one example in which each of the optical members 133 comprise a microlens sheet, the present invention is not limited thereto. The light sources 128 will be illustrated, taking an example in which first to twentieth light sources 128a to 128t are arranged in eight light source groups Gr1 to Gr8. Referring to FIG. 3 together, the first to eighth light source groups Gr1 to Gr8 of the exemplary embodiment can be driven by first to (N−1)-th light source drivers 145a to 145n−1, respectively. When the first to eighth light source groups Gr1 to Gr8 of the exemplary embodiment operate in the local dimming mode, they emit light as follows. Meanwhile, the first to twentieth light sources 128a to 128t included in the eighth light source groups Gr1 to Gr8 constituting the quad type backlight unit emit light by forming pairs of light sources disposed facing each other, e.g., a pair of the first light source 128a and the seventh light source 128g and one pair of the sixteenth 128m and the twentieth light source 128q.

Example 1 of Local Dimming Mode of Quad Type Backlight Unit

As shown in FIG. 24, the first light source 128a included in the first light source group Gr1 and the seventh light source 128g included in the third light source group Gr3 emit light by forming a pair, the fourteenth and thirteenth light sources 128o and 128p included in the fifth light source group Gr5 and the eighteenth and seventeenth light sources 128s and 128t included in the seventh light source group Gr7 emit light by forming pairs, and the sixteenth and fifteenth light sources 128m and 128n included in the sixth light source group Gr6 and the twentieth and nineteenth light sources 128q and 128r included in the eighth light source group Gr8 emit light by forming pairs. However, all the light sources 128d to 128f and 128j to 128l of the second light source group Gr2 and the fourth light source group Gr4 and part of the light sources 128b, 128c, 128h, and 128i of the first and seventh light source groups Gr1 and Gr7 do not emit light. Due to this, the liquid crystal display panel can display an image separately by the light sources of high luminance H, the light sources of medium luminance M, and the light sources of low luminance L. In the exemplary embodiment, the light sources have been illustrated as being divided into the light sources of high luminance H, the light sources of medium luminance M, and the light sources of low luminance L for the sake of convenience. However, this is merely one example, and the luminance of the liquid crystal display panel can be adjusted more finely by varying the brightness of the backlight unit by the control of the brightness of the first to twentieth light sources 128a to 128t included in the first to eighth light source groups Gr1 to Gr8. An example of such light emission of the backlight unit corresponds to a case where the image quality distribution of an image to be displayed on the liquid crystal display panel is varied. That is, conventionally, all the backlight units emit light regardless of the image quality distribution of an image. However, as shown in the exemplary embodiment, when the first to twentieth light sources 128a to 128t are operated in the local dimming mode so that their brightness overlaps in more than one part according to the image quality distribution of the image, display quality can be increased and power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to a changed screen ratio based on the dimming signals DOS and DIM and the dimming control signal SCM, and supplies it to the first to (N−1)-th light source drivers 145a to 145n−1. Then, the first to (N−1)-th light source drivers 145a to 145n−1 make the first to twentieth light sources 128a to 128t included in the first to eighth light source groups Gr1 to Gr8 emit light as shown in FIG. 24 based on the light source drive signal SCD. According to the exemplary embodiment, the light distribution of the light sources 128a to 128t can be varied as shown in FIG. 25 in the same way as in FIG. 24.

Meanwhile, in the local dimming mode of the quad type backlight unit, the fifth, sixth, seventh, and eighth light source groups Gr5, Gr6, Gr7, and Gr8 may be driven in the manner as in Examples 1 to 3 of the local dimming mode of the quad type backlight unit while emitting no light.

Hereinafter, the configuration of a display device comprising a quad type backlight unit will be described.

Figure 26:
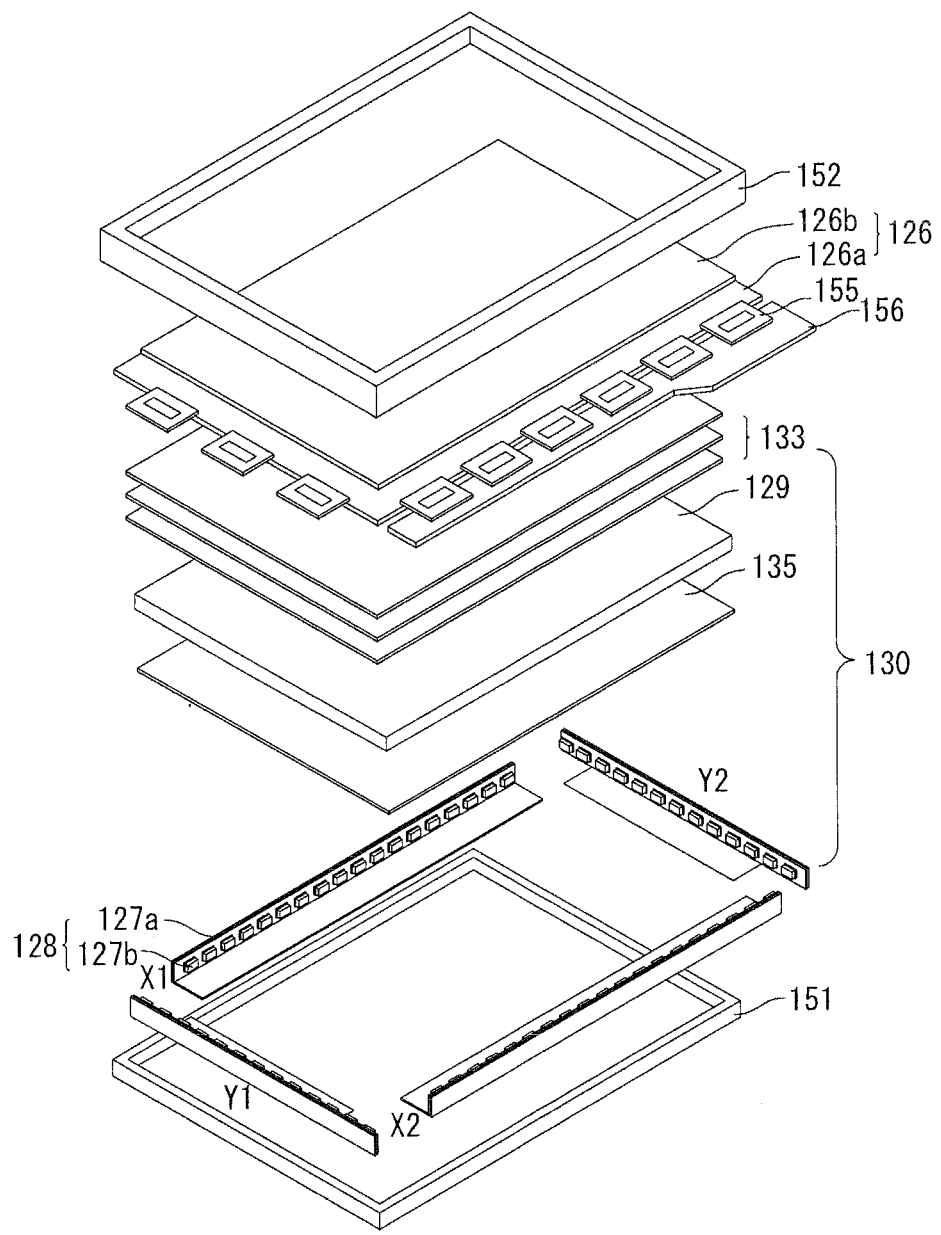
FIG. 26 is a perspective view of a display device comprising the quad type backlight unit.

FIG. 26 is a perspective view of a display device comprising the quad type backlight unit.

As shown in FIG. 26, the display device comprises a liquid crystal display panel 126 and a quad type backlight unit 130 which are positioned between a rear cover 151 and a front cover 152. The liquid crystal display panel 126 comprises a transistor substrate 126a and a color filter substrate 126b joined together with a liquid crystal layer therebetween. Data lines and gate lines constituting a pixel array of the liquid crystal display panel 126 are electrically connected to a printed circuit board 156 via a flexible film 155 and are supplied with various drive signals.

The quad type backlight unit 130 of the exemplary embodiment 130 comprises light sources 128, a light guide plate 129, a reflection plate 135, and an optical member 133. The light sources 128 included in the quad type backlight unit 130 are disposed at a first side X1, second side X2, third side X3, and fourth side X4, respectively, with respect to the liquid crystal display panel 126, and comprise light emitting parts 127b mounted on a light source substrate 127a. In the quad type backlight unit 130, light incident through the light guide plate 129 is supplied to the liquid crystal display panel 126 through the optical member 133. Here, the reflection plate 135 under the light guide plate 129 serves to cause light reflection or the like so that the light incident on the light guide plate 129 is supplied in the direction of the liquid crystal display panel 126. The optical member 133 above the light guide plate 129 serves to increase light output so that the light incident through the light guide plate 129 is efficiently supplied in the direction of the liquid crystal display panel 126.

As such, the display device comprising the quad type backlight unit 130 can display a specific image on the liquid crystal display panel 126 using the light emitted from the light sources 128 disposed at the first side X1, second side X2, third side X3, and fourth side X4 with respect to the liquid crystal display panel 126.

[Direct Type Backlight Unit]

FIG. 27 is a view for explaining a direct type backlight unit. FIGS. 28 to 31 are illustrations of local dimming mode of the direct type backlight unit.

As shown in FIG. 27, the direct type backlight unit comprises light sources 128 disposed in units of blocks under a liquid crystal display panel, a light guide plate 129 for guiding light generated from each of the light sources 128 to the liquid crystal display panel, and optical members 133 for effectively supplying the light emitted from the light guide plate 129 to the liquid crystal display panel. In the direct type backlight unit of the exemplary embodiment, first to twenty fourth light guide plates 129a to 129x have a wedge shape, and reflection plates 135a, 135i, and 135q as shown in the cross section are attached to the bottom of the light guide plates 129a to 129x. As shown in the cross section, the first to twenty fourth light guide plates 129a to 129x having a wedge shape are disposed such that part of the first, ninth, and seventeenth light guide plates 129a, 129i, and 129q overlaps with the areas where the first, ninth, and seventeenth light sources 128a, 128i, and 128q are positioned. The direct type backlight unit of the exemplary embodiment can prevent optical interference between the first to twenty fourth light sources 128a to 128x disposed at upper, lower, left, and right sides according to the structural characteristics of this configuration. The light sources 128 will be illustrated, taking an example in which the first to twenty fourth light sources 128a to 128x are arranged in twelve light source groups Gr1 to Gr12. Referring to FIG. 3 together, the first to twelfth light source groups Gr1 to Gr12 of the exemplary embodiment can be driven by first to N-th light source drivers 145a to 145n, respectively. When the first to twelfth light source groups Gr1 to Gr12 of the exemplary embodiment operate in the local dimming mode, they emit light as follows.

Example 1 of Local Dimming Mode of Direct Type Backlight Unit

Figure 28:
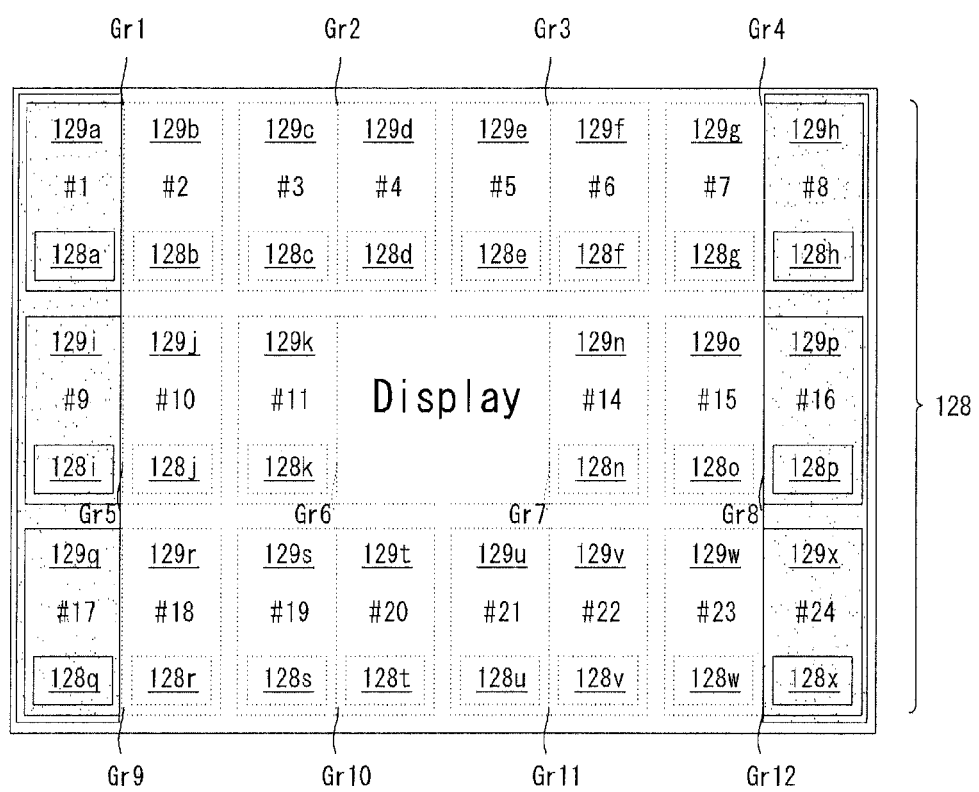
FIGS. 28 to 31 are illustrations of a local dimming mode of the direct type backlight unit.

As shown in FIG. 28, the second to seventh, tenth to fifteenth, and eighteenth to twenty third light sources 128b to 128g, 128j to 128o, and 128r to 128w, except for the first, ninth, and seventeenth light sources 128a, 128i and 128q included in the first, fifth, and ninth light source groups Gr1, Gr5, and Gr9 and the eighth, sixteenth, and twenty fourth light sources 128h, 128p, and 128x included in the fourth, eighth, and twelfth light source groups Gr4, Gr8, and Gr12, emit light. An example of such light emission of the backlight unit corresponds to a case where the screen ratio of an image to be displayed on the liquid crystal display panel changes from 16:9 to 4:3. That is, conventionally, even when a user adjusts the screen ratio displayed on the liquid crystal display panel to 4:3 when watching a movie or the like, all the backlight units emit light. However, as shown in the exemplary embodiment, when the first, ninth, seventeenth, eighth, sixteenth, and twenty fourth light sources 128a, 128i, 128q, 128h, 128p, and 128x positioned in an area except for the area corresponding to the screen ratio of 4:3 are operated in the local dimming mode not to emit light, power consumption can be effectively reduced. The number of light emitting parts of the first to twenty fourth light sources 128a to 128x included in the first to fourth light source groups Gr1 to Gr4 may be varied to be appropriate for the ratio of 4:3, but is not limited thereto. Meanwhile, the local dimming mode of the exemplary embodiment performs control such that an image display area and an image non-display area are divided and only the light sources included in a light source group corresponding to the image non-display area can emit light, as well as changing the screen ratio.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to a changed screen ratio based on the dimming signals DOS and DIM and the dimming control signal SCM, and supplies it to the first to N-th light source drivers 145a to 145n. Then, the first to N-th light source drivers 145a to 145n make the first to twenty fourth light sources 128a to 128x included in the first to twelfth light source groups Gr1 to Gr12 emit light as shown in FIG. 14 based on the light source drive signal SCD.

Example 2 of Local Dimming Mode of Direct Type Backlight Unit

Figure 29:
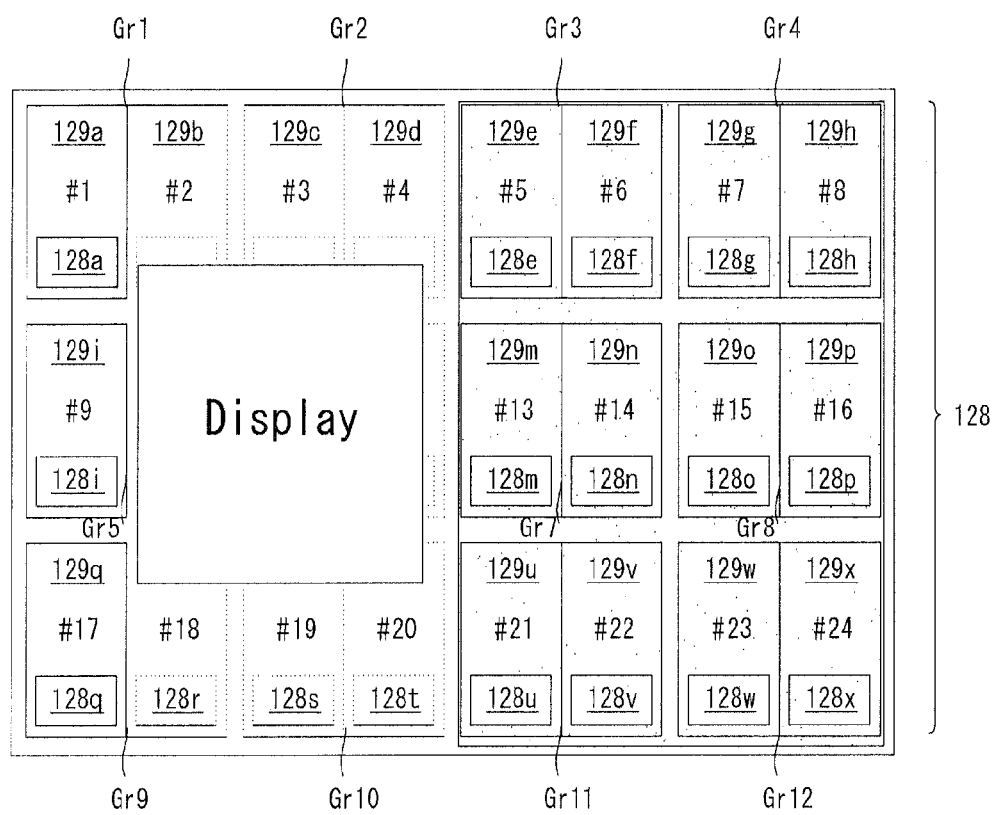

As shown in FIG. 29, the first, second, fifth, sixth, ninth, and tenth light source groups Gr1, Gr2, Gr5, Gr6, Gr9, and Gr10 and the third, fourth, seventh, eighth, eleventh, and twelfth light source groups Gr3, Gr4, Gr7, Gr8, Gr11, and Gr12 emit light at different brightness. An example of such light emission of the backlight unit corresponds to a case where high-definition images, such as video (or still image) are displayed on the left area of the liquid crystal display panel and low-definition images, such as characters, numbers, etc., are displayed on the right area of the liquid crystal display panel. That is, conventionally, when a user watches video while working on a document by dividing the liquid crystal display panel into two, all the backlight units emit light at the same brightness. However, as in the exemplary embodiment, by operating the first, second, fifth, sixth, ninth, and tenth light source groups Gr1, Gr2, Gr5, Gr6, Gr9, and Gr10 and the third, fourth, seventh, eighth, eleventh, and twelfth light source groups Gr3, Gr4, Gr7, Gr8, Gr11, and Gr12 at different brightness in the local dimming mode in accordance with their corresponding areas, power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the image quality displayed on the screen by area based on the dimming signals DOS and DIM and the dimming control signal SCM, and supplies it to the first to N-th light source drivers 145a to 145n. Then, the first to N-th light source drivers 145a to 145n make the first to twenty fourth light sources 128a to 128x included in the first to twelfth light source groups Gr1 to Gr12 emit light at different brightness as shown in FIG. 29 based on the light source drive signal SCD.

Example 3 of Local Dimming Mode of Direct Type Backlight Unit

Figure 30:
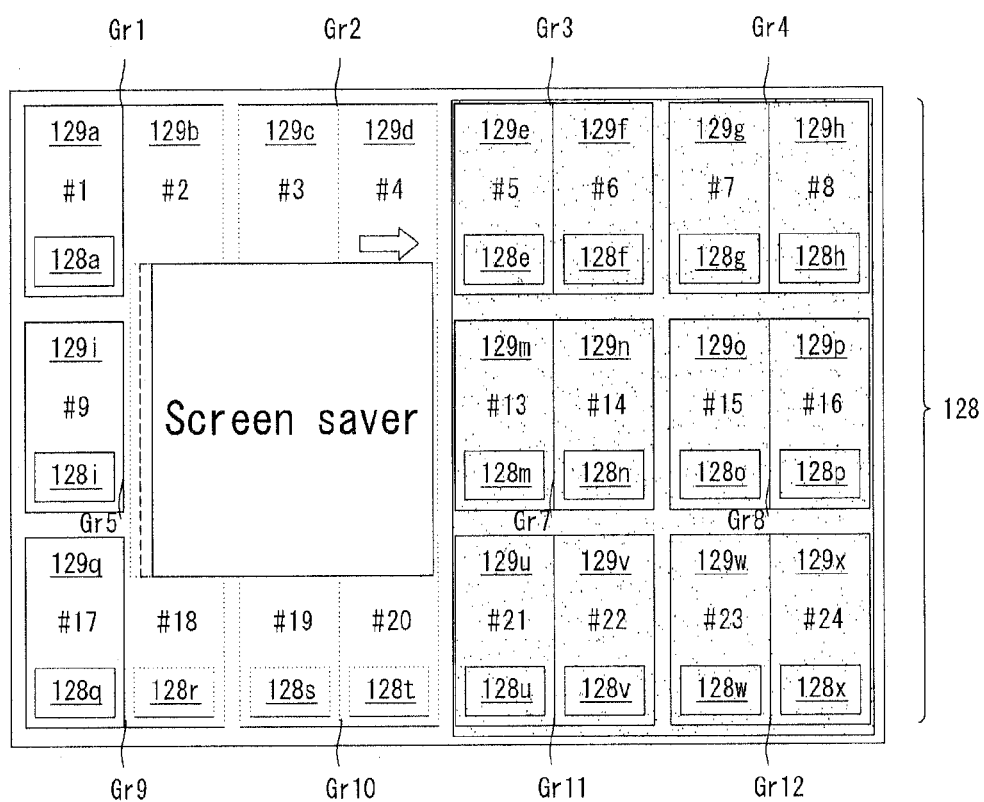
Figure 31:
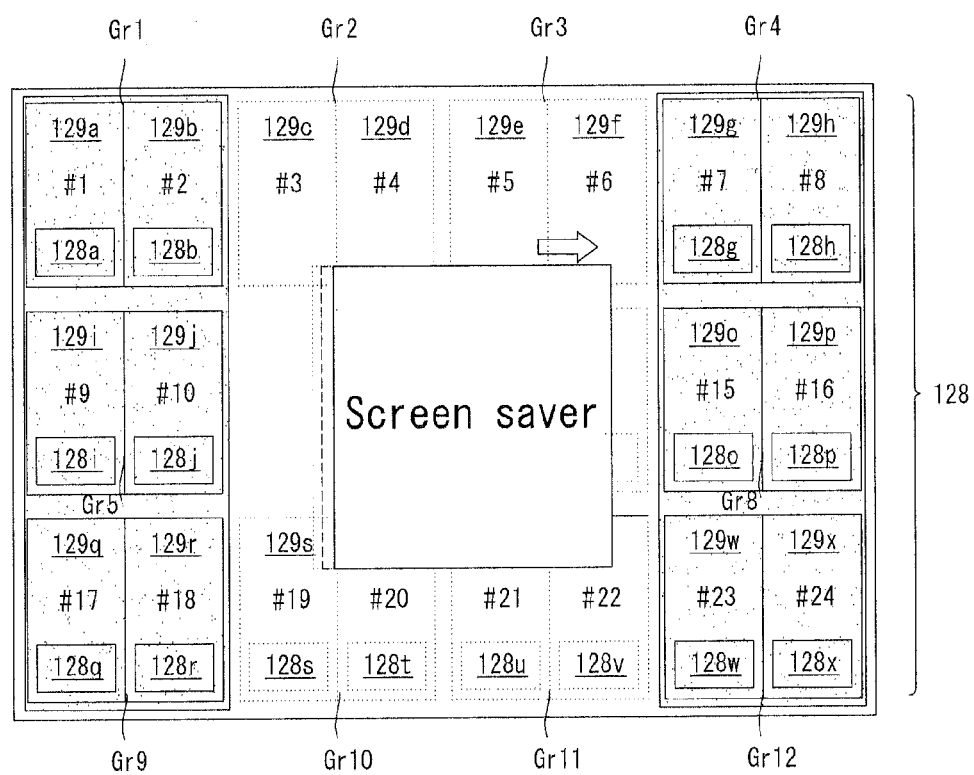

As shown in FIGS. 30 and 31, the first to twenty fourth light sources 128a to 128x included in the first to twelfth light source groups Gr1 to Gr12 emit light according to the area occupied by a moving image. An example of such light emission of the backlight unit corresponds to a case where an image, such as a screen saver, moving to a particular position is displayed on the liquid crystal display panel. That is, conventionally, even if the screen saver is moved to a particular position and displayed there, all the backlight units emit light at the same brightness. However, as in the exemplary embodiment, by operating the first to twenty fourth light sources 128a to 128x included in the first to twelfth light source groups Gr1 to Gr12 in the local dimming mode so that some of them emit light or not in accordance with the area where the screen saver moves the screen saver, power consumption can be effectively reduced.

With the backlight unit being driven in this manner, the main controller 8 supplies dimming signals DOS and DIM to the light source controller 141 and supplies a dimming drive signal SCL to the dimming controller 11. The dimming controller 11 supplies a dimming control signal SCM generated in response to the dimming drive signal SCL to the light source controller 141. The light source controller 141 generates a light source drive signal SCD corresponding to the motion of an image to be displayed on the screen based on the dimming signals DOS and DIM and the dimming control signal SCM, and supplies it to the first to N-th light source drivers 145a to 145n. Then, the first to N-th light source drivers 145a to 145n make part of the first to twenty fourth light sources 128a to 128x included in the first to twentieth light source groups Gr1 to Gr12 emit light or not as shown in FIGS. 30 and 31 based on the light source drive signal SCD.

Hereinafter, the configuration of a display device comprising a direct type backlight unit will be described.

Figure 32:
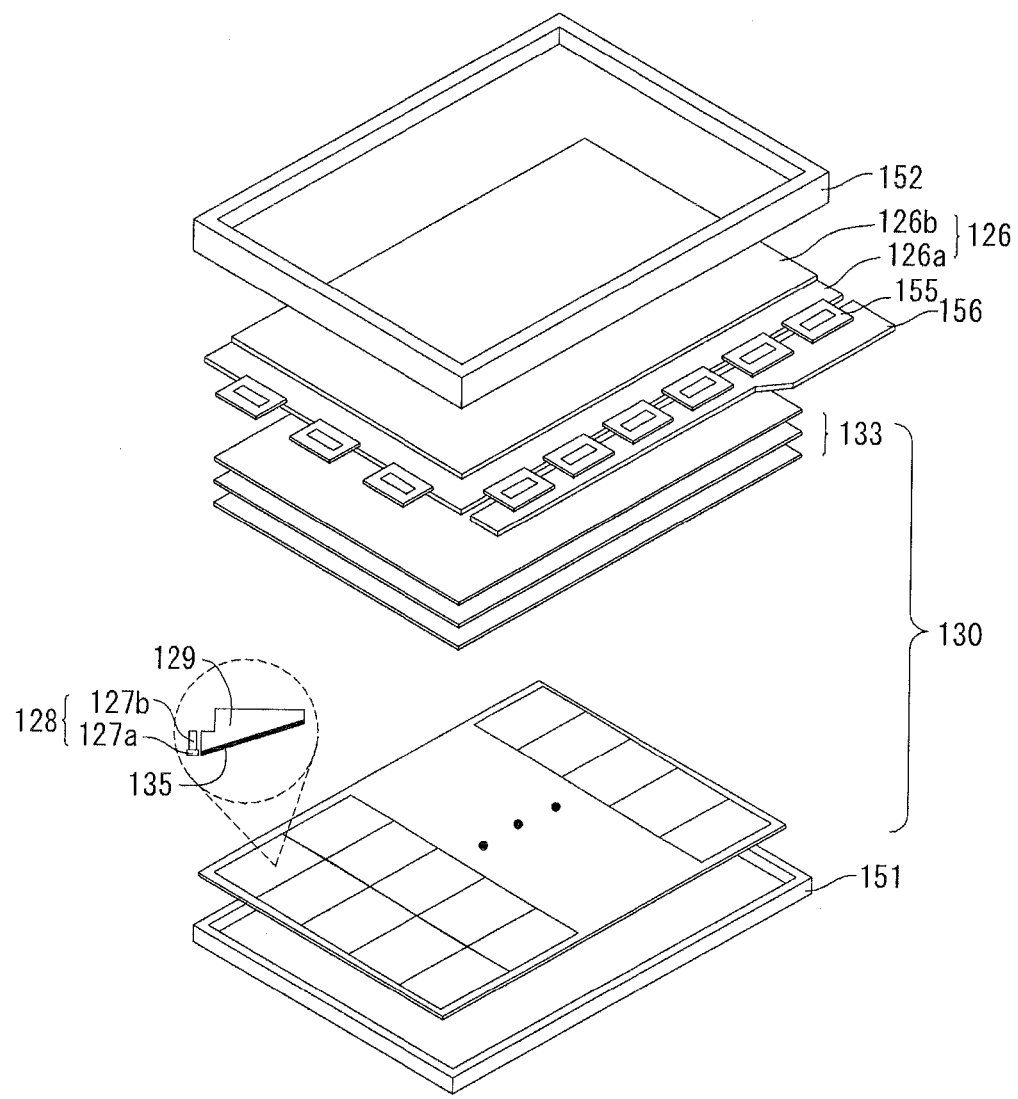
FIG. 32 is a perspective view of a display device comprising the direct type backlight unit.

FIG. 32 is a perspective view of a display device comprising the direct type backlight unit.

As shown in FIG. 22, the display device comprises a liquid crystal display panel 126 and a direct type backlight unit 130 which are positioned between a rear cover 151 and a front cover 152. The liquid crystal display panel 126 comprises a transistor substrate 126a and a color filter substrate 126b joined together with a liquid crystal layer therebetween. Data lines and gate lines constituting a pixel array of the liquid crystal display panel 126 are electrically connected to a printed circuit board 156 via a flexible film 155 and are supplied with various drive signals.

The direct type backlight unit 130 of the exemplary embodiment 130 comprises light sources 128, a light guide plate 129, a reflection plate 135, and an optical member 133. The light sources 128 included in the direct type backlight unit 130 are disposed in units of blocks under the liquid crystal display panel 126, and comprise light emitting parts 127b mounted on a light source substrate 127a. In the direct type backlight unit 130, a plurality of light guide plates 129 and reflection plates 135 are disposed, divided corresponding to the blocks of the light sources 128. In the direct type backlight unit 130, light incident through the light guide plate 129 is supplied to the liquid crystal display panel 126 through the optical member 133. Here, the reflection plate 135 under the light guide plate 129 serves to cause light reflection or the like so that the light incident on the light guide plate 129 is supplied in the direction of the liquid crystal display panel 126. The optical member 133 above the light guide plate 129 serves to increase light output so that the light incident through the light guide plate 129 is efficiently supplied in the direction of the liquid crystal display panel 126. In addition, the direct type backlight unit 130 may further comprise a transparent reflection plate 136 covering all of the light sources 128 disposed in units of blocks.

As such, the display device comprising the direct type backlight unit 130 can display a specific image on the liquid crystal display panel 126 using the light emitted from the light sources 128 disposed in units of blocks under the liquid crystal display panel 126.

As seen from above, the present invention provides a display device, which can improve display quality and reduce power consumption by enhancing contrast ratio and motion blur according to an image to be displayed on the display panel and the structure of the backlight unit, and a method for driving the same. Moreover, the present invention provides a very precise local dimming effect that enables the fine image control of even a small area of an image displayed on the liquid crystal display panel by making the light sources included in one of a plurality of light source groups emit light or not and adjusting the brightness between the emitted light sources.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:
1. A display device comprising:
a first substrate;
a dimming controller;
light emitting device (LED) light sources mounted on the first substrate;
light source drivers to drive the LED light sources;
a light source controller configured to control the light source drivers in response to dimming signals output from the dimming controller;
a light guide plate including a side surface on which light emitted from the LED light sources is incident and a back surface from which light is emitted in a direction different from a direction of the light incident on the side surface; and a panel disposed on the light guide plate and displaying a video image, wherein at least first and second LED light sources adjacent to each other, among the LED light sources on the first substrate, are controlled differently from other LED light sources on the first substrate based on the video image, wherein the light guide plate includes a pattern positioned therein corresponding to areas of the LED light sources, wherein the pattern is to prevent the light emitted from one light source from being distributed to the area of neighboring light source, wherein the pattern is formed in any one or more of a first shape and a second shape, the first shape being narrow in a lower portion and wide in an upper portion, and the second shape being wide in a lower portion and narrow in an upper portion, wherein the light source drivers are respectively designated by different addresses to control the LED light sources individually, and wherein the light source controller receives the signals output from the dimming controller via a Serial Peripheral Interface.

2. The display device of claim 1, wherein an input signal applied to the first and second LED light sources on the first substrate is different from that applied to the other LED light sources on the first substrate.

3. The display device of claim 1, wherein average brightness of the first and second LED light sources on the first substrate is different from that of the other LED light sources on the first substrate.

4. The display device of claim 1, further comprising:
a second substrate different from the first substrate, and
at least third and fourth LED light sources adjacent to each other of the second substrate are controlled differently from the first and second LED light sources based on the video image.

5. The display device of claim 4, wherein an input signal applied to the third and fourth LED light sources on the second substrate is different from that applied to the first and second LED light sources.

6. The display device of claim 4, wherein average brightness of the third and fourth LED light sources adjacent to each other of the second substrate is different from that of the first and second LED light sources.

7. The display device of claim 1, wherein the display device includes an edge type backlight unit having the LED light sources disposed at side portions of the light guide plate.

8. The display device of claim 1, wherein the light guide plate comprises at least a first light guide plate and a second light guide plate adjacent to the first light guide plate.

9. The display device of claim 8, wherein the first light guide plate and the second light guide plate at least partially overlap with each other.

10. The display device of claim 1, wherein, when a screen ratio of the video image changes from 16:9 to 4:3, the display device makes the LED light sources positioned in an area except for the area corresponding to the screen ratio of 4:3 emit no light.

11. The display device of claim 1, wherein, when the video image is displayed, divided into a high-definition image on a left side of the panel and a low-definition image on a right side of the panel, a brightness of the LED light sources positioned in the area corresponding to the low-definition image is decreased compared to a brightness of the LED light sources positioned in the area corresponding to the high-definition image.

12. The display device of claim 1, wherein, when the video image moves on the panel, a backlight unit makes only the LED light sources positioned in the area corresponding to occupied area of the moving image emit light.

13. The display device of claim 1, wherein, when the video image is displayed on the panel, divided into at least two with a non-display area in between, the display device makes the LED light sources positioned in the area corresponding to the video image emit light and makes the LED light sources positioned in the area corresponding to the non-display area emit no light.

14. A backlight unit comprising:
a first substrate;
a dimming controller;
light emitting diode (LED) light sources mounted on the first substrate; and
light source drivers to drive the LED light sources;
a light source controller configured to control the light source drivers in response to dimming signals output from the dimming controller;
a light guide plate including a side surface on which light emitted from the LED light sources is incident and a back surface from which light is emitted in a direction different from a direction of the light incident on the side surface, wherein at least first and second LED light sources adjacent to each other, among the LED light sources on the first substrate, are controlled differently from other LED light sources on the first substrate based on the video image, wherein the light guide plate includes a pattern positioned therein corresponding to areas of the LED light sources, wherein the pattern is to prevent the light emitted from one light source from being distributed to the area of neighboring light source, wherein the pattern is formed in any one or more of a first shape and a second shape, the first shape being narrow in a lower portion and wide in an upper portion, and the second shape being wide in a lower portion and narrow in an upper portion, wherein the light source drivers are respectively designated by different addresses to control the LED light sources individually, and wherein the light source controller receives the signals output from the dimming controller via a Serial Peripheral Interface.

15. The backlight unit of claim 14, wherein an input signal applied to the first and second LED light sources on the first substrate is different from that applied to the other LED light sources on the first substrate.

16. The backlight unit of claim 14, wherein average brightness of the first and second LED light sources on the first substrate is different from that of the other LED light sources on the first substrate.

17. The backlight unit of claim 14, further comprising a second substrate different from the first substrate,
wherein at least third and fourth LED light sources adjacent to each other of the second substrate are controlled differently from the first and second LED light sources based on the video image.

18. The backlight unit of claim 17, wherein average brightness of the third and fourth LED light sources adjacent to each other of the second substrate is different from that of the first and second LED light sources.

* * * * *